(12) United States Patent
Murata et al.

(10) Patent No.: US 10,884,540 B2
(45) Date of Patent: Jan. 5, 2021

(54) DISPLAY DEVICE WITH DETECTION OF FOLD BY NUMBER AND SIZE OF TOUCH AREAS

(71) Applicant: SHARP KABUSHIKI KAISHA, Sakai (JP)

(72) Inventors: Tetsuo Murata, Sakai (JP); Tomohiro Kimura, Sakai (JP); Naru Usukura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/564,405

(22) Filed: Sep. 9, 2019

(65) Prior Publication Data

US 2020/0081491 A1    Mar. 12, 2020

Related U.S. Application Data

(60) Provisional application No. 62/729,917, filed on Sep. 11, 2018.

(51) Int. Cl.
*G06F 3/041* (2006.01)
*G06F 1/16* (2006.01)
(52) U.S. Cl.
CPC .......... *G06F 3/0416* (2013.01); *G06F 1/1652* (2013.01)

(58) Field of Classification Search
CPC .. G06F 3/0416; G06F 3/04186; G06F 3/0446; G06F 2203/04105; G06F 1/1652; G06F 1/1677
See application file for complete search history.

(56) References Cited

U.S. PATENT DOCUMENTS

| | | | |
|---|---|---|---|
| 10,019,052 B2* | 7/2018 | Lee | G06F 3/01 |
| 10,481,720 B2* | 11/2019 | Hong | G06F 3/0414 |
| 2009/0066663 A1* | 3/2009 | Chang | G06F 3/044 345/173 |
| 2015/0103023 A1* | 4/2015 | Iwaki | G06F 3/0488 345/173 |

FOREIGN PATENT DOCUMENTS

JP    2014-016519 A    1/2014

* cited by examiner

*Primary Examiner* — Liliana Cerullo
(74) *Attorney, Agent, or Firm* — ScienBiziP, P.C.

(57) ABSTRACT

A display device includes: a foldable display panel having flexibility; a touch detector disposed selectively on one panel face side of the display panel and capable of detecting a plurality of touch areas; and a determiner for detecting that the display panel is folded only if the touch areas detected by the touch detector are three or more in number, and a largest first touch area thereof is located between the touch areas other than the first touch area.

13 Claims, 28 Drawing Sheets

DISPLAY DEVICE WITH DETECTION OF FOLD BY NUMBER AND SIZE OF TOUCH AREAS

CROSS REFERENCE TO RELATED APPLICATION

This application claims priority from U.S. provisional patent application No. 62/729,917 field on Sep. 11, 2018. The entire contents of the priority application are incorporated herein by reference.

TECHNICAL FIELD

The present invention relates to a display device.

BACKGROUND

Conventionally, as an example of a display device, one described in Japanese Unexamined Patent Application Publication No. 2014-16519 mentioned below is known. The display device described in Japanese Unexamined Patent Application Publication No. 2014-16519 is provided with a deformable displaying means, a deformation detecting means for detecting a deformed state of the displaying means, and a changing means for changing display regions for display data displayed on the display means 3, in a situation where the display means is deformed, when a continuous change in the position of deformation of the display means is detected by the deformation detecting means, according to the change in the position of deformation.

Japanese Unexamined Patent Application Publication No. 2014-16519 mentioned above provides touchscreens on both front and back faces, respectively, of a display unit that is the display means, thereby detecting the position of deformation of the display unit. Therefore, there is the problem that power consumption tends to be high because the touchscreens on both the front and back faces of the display unit are required to be driven, and furthermore complicated arithmetic processing regarding a signal detected by each of the front and back touchscreens is required.

SUMMARY

The present invention was completed in view of these circumstances, and an object thereof is to achieve lower power consumption.

(1) An embodiment of the present invention is a display device provided with: a foldable display panel having flexibility; a touch detector disposed selectively on one panel face side of the display panel and capable of detecting a plurality of touch areas; and a determiner for detecting that the display panel is folded only if the touch areas detected by the touch detector are three or more in number, and a largest first touch area thereof is located between the touch areas other than the first touch area.

(2) In addition, an embodiment of the present invention is the display device wherein the determiner determines that the display panel is folded only if a size difference or ratio of the first touch area from/to a second largest second touch area of the three or more touch areas detected by the touch detector is equal to or less than a threshold, in addition to the configuration of the above (1).

(3) In addition, an embodiment of the present invention is the display device wherein the determiner determines that the display panel is folded at two places only if a size difference or ratio of the first touch area from/to a second largest second touch area of the three or more touch areas detected by the touch detector is equal to or less than a threshold and the first touch area and the second touch area are located between the touch areas other than the first touch area and the second touch area, respectively, in addition to the configuration of the above (1) or (2).

(4) In addition, an embodiment of the present invention is the display device wherein the determiner determines that a second largest second touch area of the three or more touch areas detected by the touch detector is present in a front side section disposed on a front side with respect to a folded section of the display panel, in addition to the configuration of any one of the above (1) to (3).

(5) In addition, an embodiment of the present invention is the display device provided with: a display controller for controlling display of an image on the display panel, wherein the display controller displays an image on at least one portion of the front side section of the display panel, but makes an image undisplayed on the folded section and a back side section disposed on a back side thereof of the display panel, in addition to the configuration of the above (4).

(6) In addition, an embodiment of the present invention is the display device wherein the display controller displays an image outside the second touch area of the front side section, but makes an image undisplayed on the second touch area of the front side section, in addition to the configuration of the above (5).

(7) In addition, an embodiment of the present invention is the display device provided with: a touch controller for controlling detection of the touch areas performed by the touch detector, wherein the touch controller activates detection of the touch areas in at least one portion of the front side section of the display panel, but deactivates detection of the touch areas in the folded section and a back side section disposed on a back side thereof of the display panel, in addition to the configuration of the above (4) or (5).

(8) In addition, an embodiment of the present invention is the display device wherein the touch controller activates detection of the touch areas outside the second touch area of the front side section, but deactivates detection of the touch areas in the second touch area of the front side section, in addition to the configuration of the above (7).

(9) In addition, an embodiment of the present invention is the display device provided with: a display controller for controlling display of an image on the display panel, wherein the display controller displays different images on the second touch area and outside the second touch area, respectively, in the front side section of the display panel, but makes an image undisplayed on the folded section and a back side section disposed on a back side thereof of the display panel, in addition to the configuration of the above (8).

(10) In addition, an embodiment of the present invention is the display device provided with: a touch controller for controlling detection of the touch areas performed by the touch detector and also extracting a detection intensity of each of the touch areas, wherein the determiner determines as a genuine touch area where a touch inputter for inputting the touch area touches the display panel if the detection intensity extracted by the touch controller is higher than a threshold, and determines as a hover touch area where the touch inputter does not touch but gets close to the display panel if the detection intensity extracted by the touch controller is lower than a threshold, in addition to the configuration of any one of the above (1) to (9).

(11) In addition, an embodiment of the present invention is the display device wherein the determiner determines that the touch inputter is a finger of a user and that a direction from the genuine touch area toward the hover touch area is a direction toward a base of the finger if a portion of an outer peripheral edge of the genuine touch area is contiguous to the hover touch area, in addition to the configuration of the above (10).

(12) In addition, an embodiment of the present invention is the display device provided with: a pressure detector disposed on a panel face identical to the one panel face side having the touch detector of the display panel for detecting a pressure inputted by a touch inputter for inputting one of the touch areas, wherein the determiner determines that the touch area into which the pressure has been inputted has been depressed only if the pressure detected by the pressure detector is equal to or higher than a threshold, in addition to the configuration of any one of the above (1) to (11).

(13) In addition, an embodiment of the present invention is the display device provided with: a display controller for controlling display of an image on the display panel, wherein the determiner determines that a second largest second touch area of the three or more touch areas detected by the touch detector is present in a front side section disposed on a front side with respect to a folded section of the display panel if determining that the display panel is folded, and the display controller displays a specific image selectively on an overlapping area overlapping in the front side section with the touch area inputted into a back side section disposed on a back side with respect to the folded section of the display panel, in addition to the configuration of the above (12).

(14) In addition, an embodiment of the present invention is the display device wherein the touch detector is composed of a capacitive touchscreen pattern, in addition to the configuration of any one of the above (1) to (13).

According to the present invention, low power consumption can be achieved.

DETAILED DESCRIPTION

First Embodiment

A first embodiment of the present invention will be described with reference to FIGS. 1 to 12. In the first embodiment, a display device 10 provided with a display panel 11 having flexibility will be described. It should be noted that an X-axis, a Y-axis, and a Z-axis are shown in a portion of each drawing, and the depiction is made such that the direction of each axis is coincident with a direction indicated in each drawing.

Figure 1:
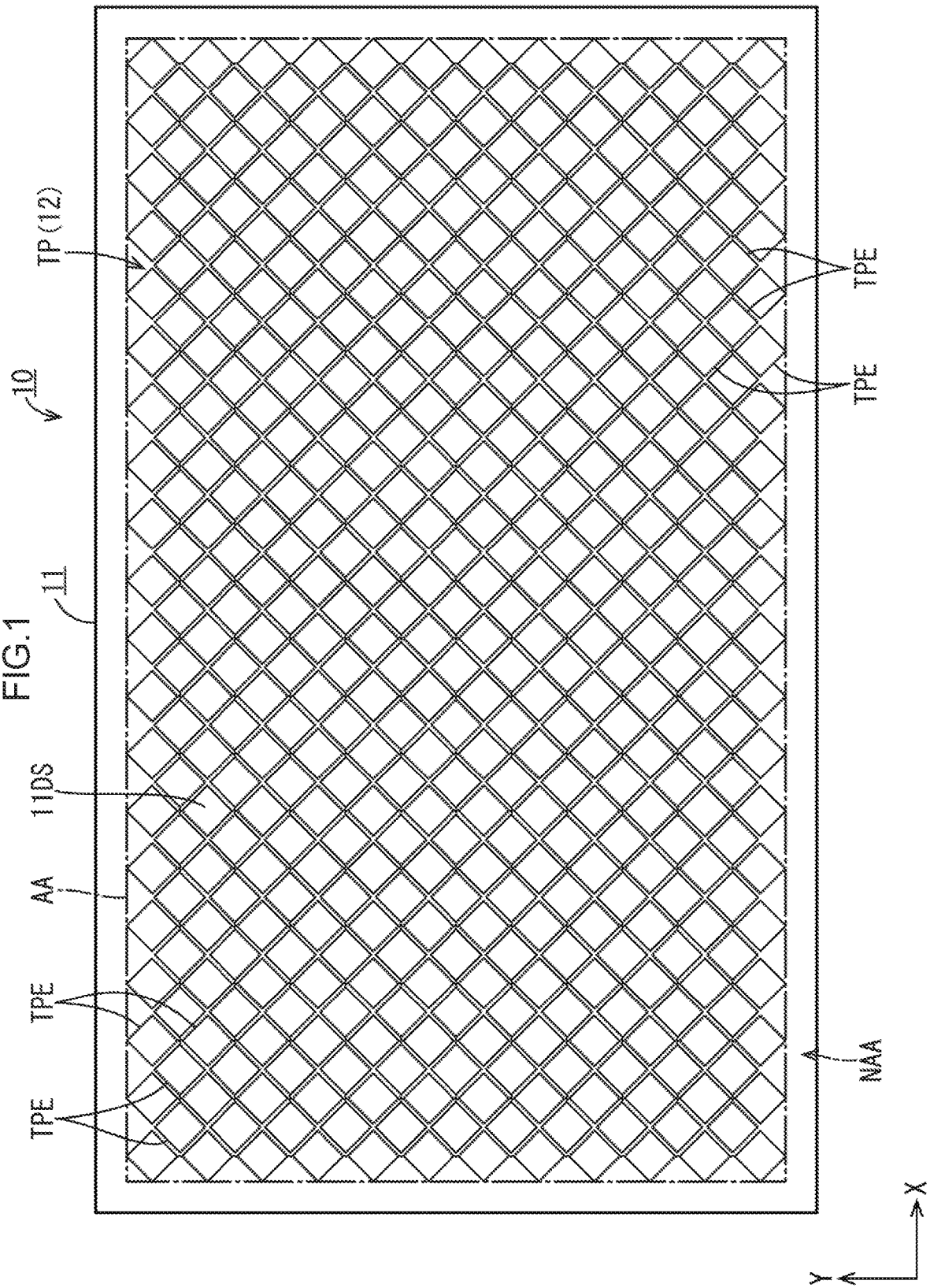
FIG. 1 is a plan view of a display panel provided in a display device according to a first embodiment of the present invention.
Figure 2:
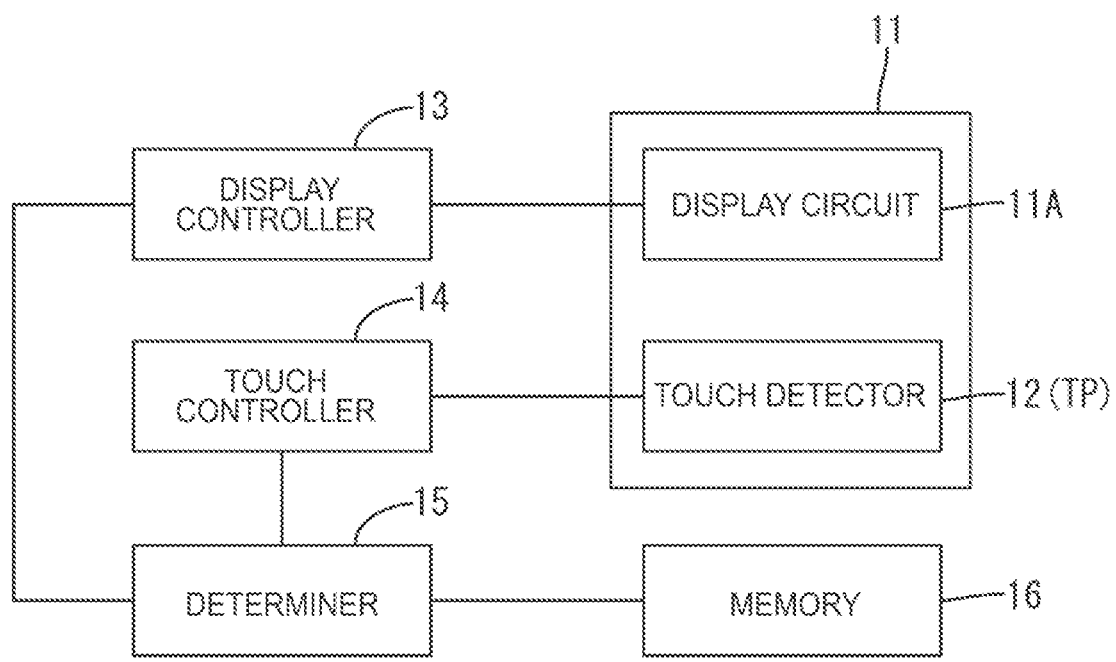
FIG. 2 is a block diagram illustrating an electrical configuration of the display device.

The display panel 11 provided in the display device 10 has a landscape-oriented rectangular planar shape, as shown in FIG. 1. The display panel 11 is made by forming a circuit (including a display circuit 11A described later) and the like on a substrate having sufficiently-high flexibility, and specifically it is an organic EL display panel, an electrophoretic display panel, or the like, for example. Therefore, a user of the display device 10 can deform the display panel 11, if necessary, and can even fold it, for example. The display panel 11 has a display screen 11DS capable of displaying an image thereon, and the display screen 11DS is divided into an active area AA that is a region which is located on the central side and in which the image is actually displayed, and a non-active area NAA which is located on the outer peripheral edge side and has a bezel-like shape enclosing the active area AA and in which the image is not displayed. The display panel 11 has a long-side direction, a short-side direction, and a normal direction to the display screen 11DS coincident with the X-axis direction of each drawing, the Y-axis direction of each drawing, and the Z-axis direction of each drawing, respectively. It should be noted that, in FIG. 1, a dashed-dotted line depicts the outline of the active area AA, and a region outside the dashed-dotted line is the non-active area NAA.

The display panel 11 has a touch detector 12, as shown in FIG. 1, for detecting, when the display panel 11 is touched by the user, a touch area TA thereof. The touch detector 12 is disposed selectively on one having the display screen 11DS of both front and back faces of the display panel 11. That is, the touch detector 12 is not disposed on the opposite panel face to the display screen 11DS of the display panel 11. The touch detector 12 is composed of a so-called projected capacitive touchscreen pattern TP. The touchscreen pattern TP is at least provided with a plurality of touch electrodes arranged in a matrix in the active area AA of the display panel 11. Therefore, the active area AA of the display panel 11 is substantially coincident with a touch detection region where the touch area TA can be detected, and the non-active area NAA is substantially coincident with a touch non-detection region where the touch area TA cannot be detected. Further, when touch operation is inputted by a hand HAN (see FIGS. 4 to 7) that is a touch inputter on the basis of an image in the active area AA viewed by the user, a capacitance is formed between the hand HAN and the touch electrode TPE. Because of this, the capacitance detected at the touch electrode TPE located near the hand HAN changes as the hand approaches, and becomes different from the touch electrode TPE located far from the hand HAN, and therefore, on the basis of that, the touch area TA inputted can be detected. The touch electrode TPE has a substantially rhombic planar shape that is, for example, about 2 mm to 4 mm long on each side. Therefore, when a finger FIN and/or a palm PAL of the hand HAN touches the display screen 11DS, normally, the capacitances of the plurality of touch electrodes TPE continuously arranged change, the number of which tends to be proportional to the area of contact of the finger FN or the palm PAL with respect to the display screen 11DS. For this reason, a plurality of touch electrodes TPE arranged continuously within a panel face of the display screen 11DS and simultaneously having the capacitance changed constitute one touch area TA. The touch detector 12 according to the first embodiment is capable of detecting a plurality of such touch areas TA as described above, and thus capable of detecting so-called "multi-touch". It should be noted that the touchscreen pattern TP includes not only the touch electrodes TPE described above but also touch wiring connected to the touch electrodes and capable of transferring a signal, and the like. The touchscreen pattern TP is composed of a transparent electrode film, a mesh-like metal film, or the like.

A flexible substrate (not shown and neither is a control board) connected on one end side to the control board is connected on the other end side to the display panel 11. The control board is at least provided with a display controller 13 for controlling the display circuit 11A provided in the display panel 11, and a touch controller 14 for controlling the touch detector 12. The display controller 13 controls drive of the display circuit 11A by supplying various signals to the display circuit 11A via the flexible substrate, and thereby can display a predetermined image in the active area AA. The touch controller 14 controls the touch detector 12 by supplying various signals to the touch detector 12 via the flexible substrate, and thereby can detect the touch area TA inputted into the display screen 11DS. Further, the control board is provided with a determiner 15 for determining whether or not the display panel 11 is folded, or the like, on the basis of the touch area TA detected by the tough detector 12. Furthermore, the control board is provided with a memory 16 for storing various data referred to by the determiner 15.

Figure 6:
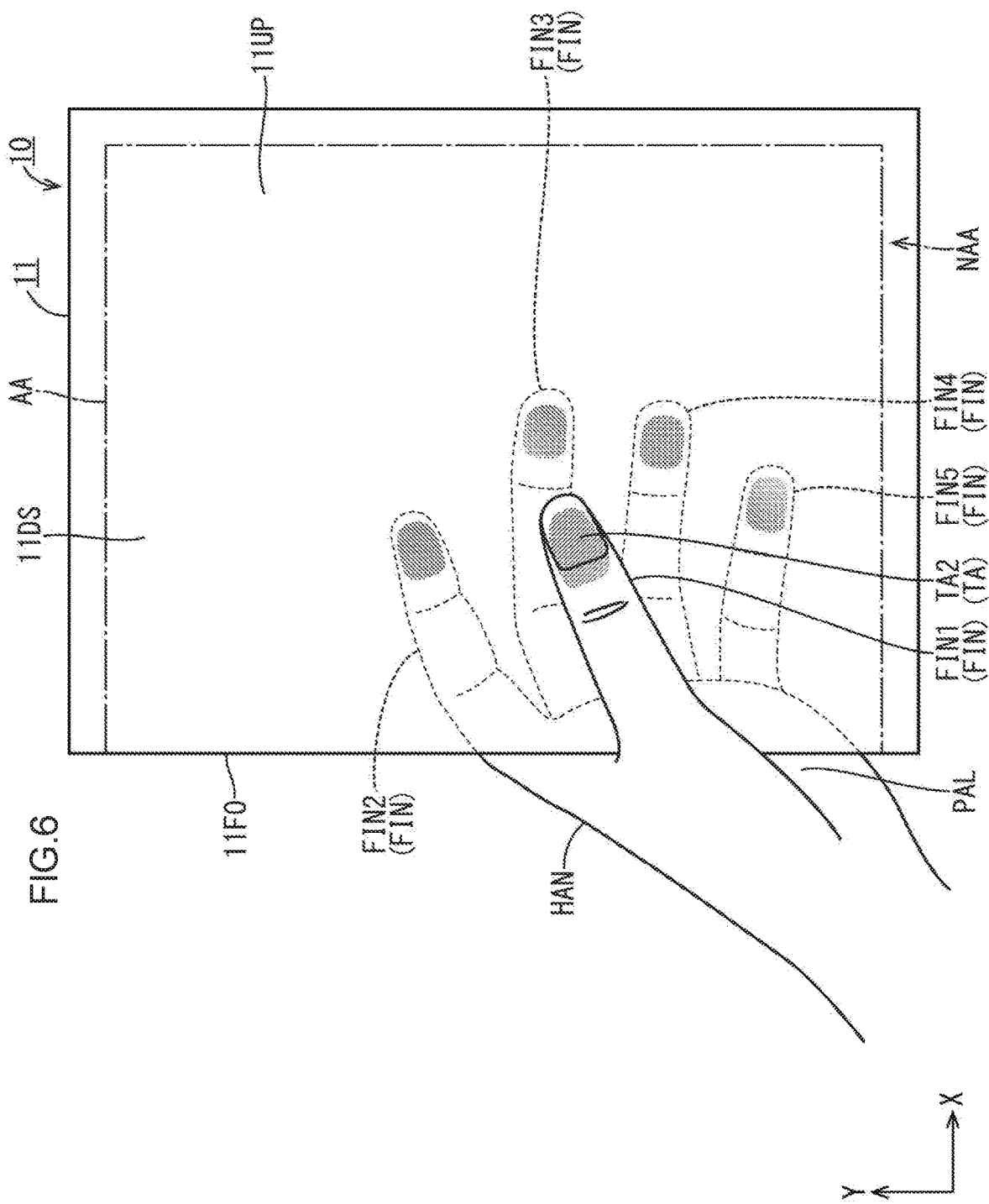
FIG. 6 is a plan view illustrating a user holding and folding a central portion of the display panel with the user's hand.
Figure 7:
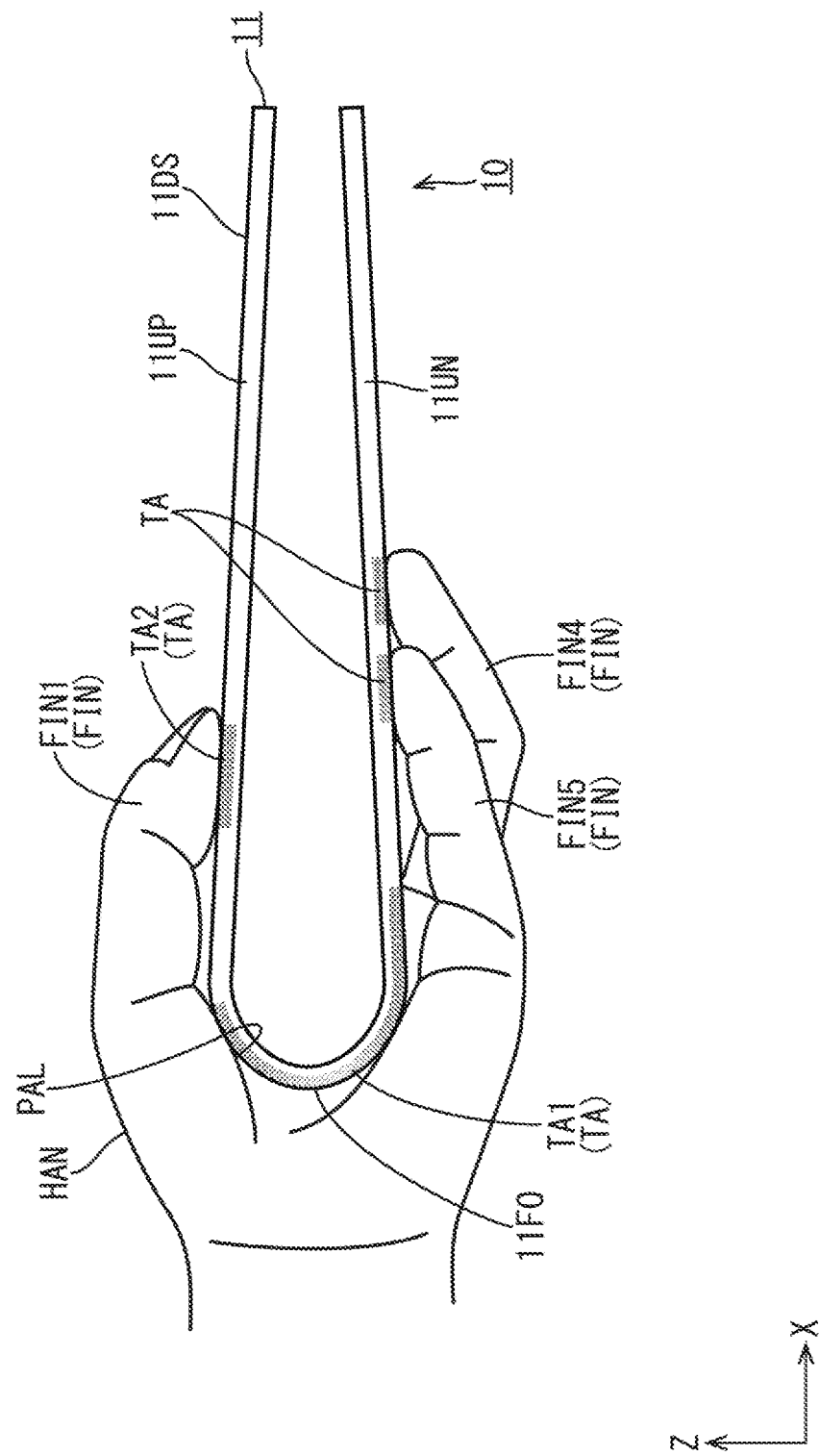
FIG. 7 is a front view illustrating the user holding and folding the central portion of the display panel with the user's hand.
Figure 8:
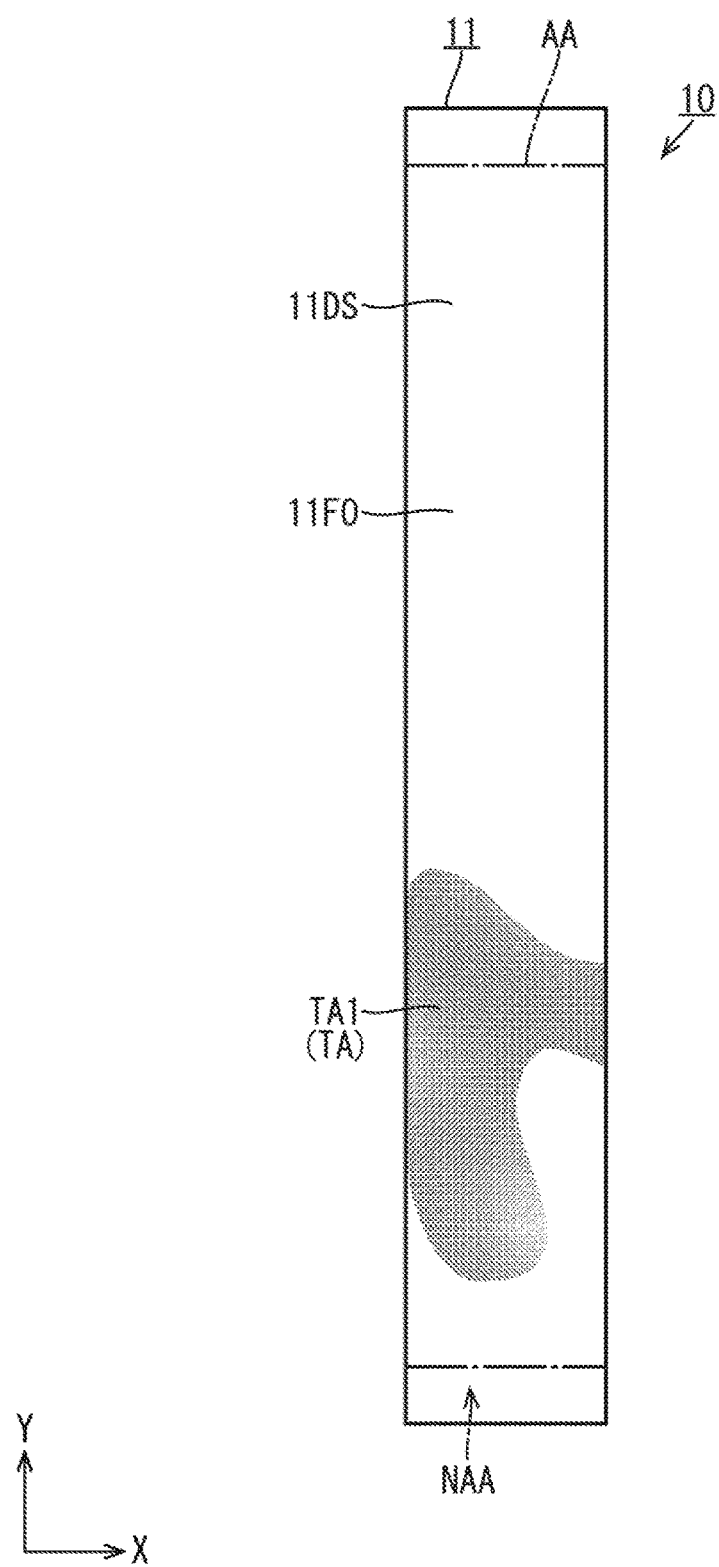
FIG. 8 is a side view illustrating the user holding and folding the central portion of the display panel with the user's hand.

Now, a folded shape of the display panel 11 that is a subject of determination made by the determiner 15 mentioned above, how the folded display panel 11 is held by the user, and the like, will be described in detail. First, when the user folds and uses the display panel 11, the display screen 11DS usually faces outside so that the user can view an image. The display panel folded such that the display screen 11DS faces outside is divided into three sections, as shown in FIG. 7: a folded section 11FO; an upside section 11UP disposed on a front side with respect to the folded section 11FO, that is, on the user's side; and a underside section 11UN disposed on a back side with respect to the folded section 11FO, that is, on the opposite side to the user's side. Of these sections, the folded section 11FO curves with the largest curvature, whereas the upside section 11UP and the underside section 11UN curve with smaller curvatures than the folded section 11FO does, or have an almost-uncurved and roughly-flat shape. When the display panel 11 thus folded is held with the user's hand HAN, the palm PAL touches the folded section 11FO, and the fingers FIN touch the upside section 11UP and the underside section 11UN, as shown in FIGS. 6 to 8. It should be noted that, in order to distinguish the fingers FIN, the indices "1", "2", "3", "4", and "5" are appended to the reference signs for the thumb, the index finger, the middle finger, the ring finger, and the little finger, respectively, and these indices are not appended when the fingers are not distinguished but referred to collectively. In more detail, generally, at least the thumb FIN1 touches the upside section 11UP of the display panel 11, and the four fingers FIN2 to FIN5 other than the thumb FIN1 touch the underside section 11UN. The area of contact of the hand HAN with respect to the display panel 11 differs from part to part, the area of contact of the palm PAL is the largest, the area of contact of the thumb FIN1 is the second largest, and the areas of contact of the other fingers FIN2 to FIN5 are the third and subsequent largest. It should be noted that, in FIGS. 4 to 13, the touch area TA is shown by hatching lines. In addition, the touch detector 12 according to the first embodiment detects as the touch area TA a "genuine touch area" in which the user directly touches the display screen 11DS of the display panel 11.

Figure 3:
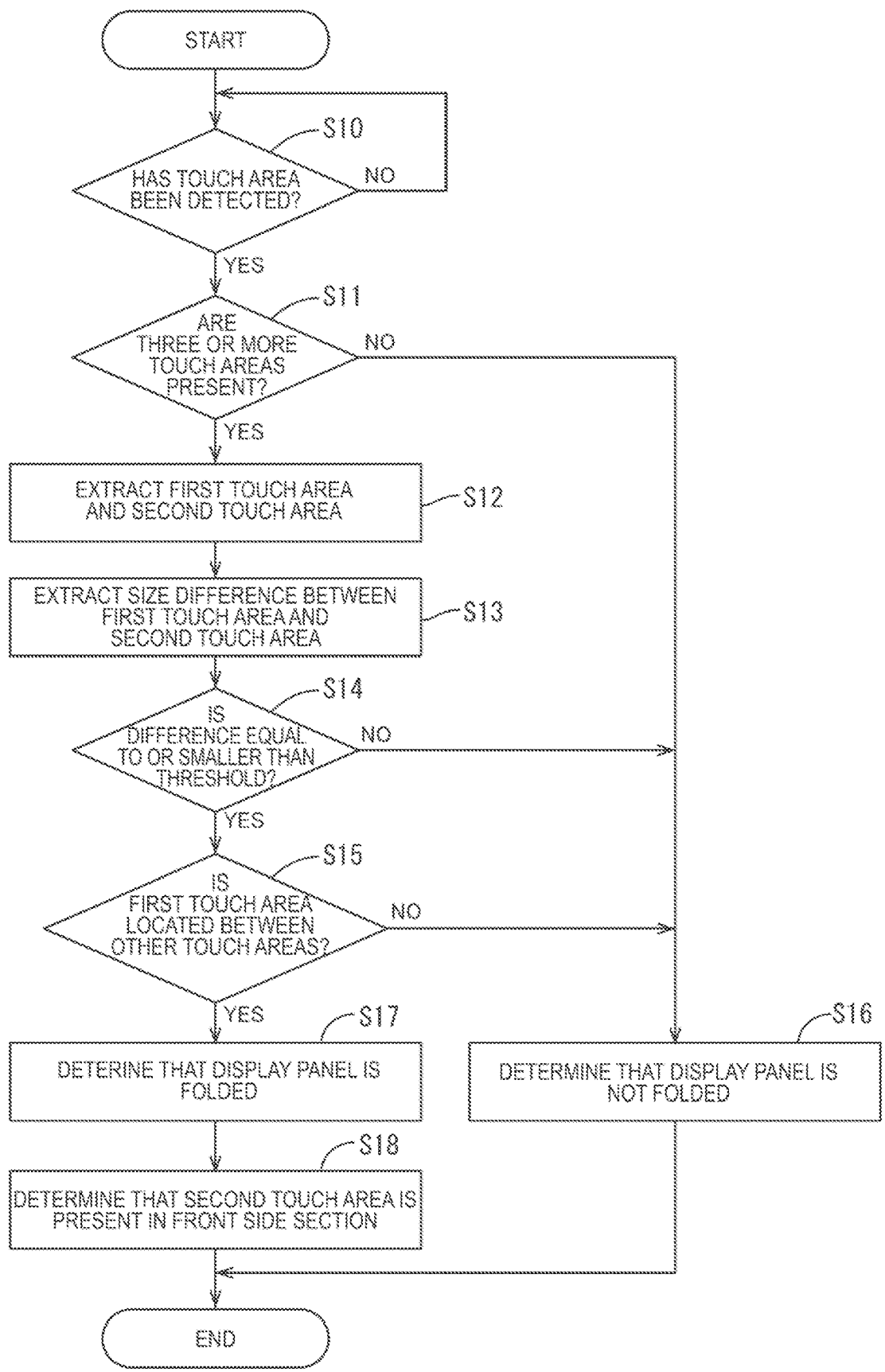
FIG. 3 is a flowchart illustrating a procedure for determining whether or not the display panel is folded.

Next, a specific procedure for the determiner 15 determining whether or not the display panel 11 is folded will be described with reference to the flowchart shown in FIG. 3. First, the determiner 15 performs processing for determining whether or not the touch area TA has been detected by the touch detector 12, as shown in FIG. 3 (step S10). At this time, if the touch area TA has not been detected, the procedure returns to step S10. On the other hand, if the touch area TA has been detected, the determiner 15 performs processing for determining whether or not three or more touch areas TA have been detected (step S11). At this time, if three or more touch areas TA have not been detected, the determiner 15 determines that the display panel 11 is not folded (step S16). On the other hand, if three or more touch areas TA have been detected, the determiner 15 performs processing for extracting the largest touch area TA as a first touch area TA1 and extracting the second largest touch area TA as a second touch area TA2 from the three or more touch areas TA (step S12). Thereafter, the determiner 15 performs processing for extracting a size difference between the first touch area TA1 and the second touch area TA2 (step S13). Then, the determiner 15 performs processing for determining whether or not the size difference between the first touch area TA1 and the second touch area TA2 is equal to or smaller than a threshold stored in the memory 16 (step S14). At this time, if the above difference exceeds the threshold, the determiner 15 determines that the display panel 11 is not folded (step S16). On the other hand, if the above difference is equal to or less than the threshold, the determiner 15 performs processing for determining whether or not the first touch area TA1 is located between the other touch areas TA (step S15). Regarding this processing, specifically, the determiner 15 compares a positional relation of the second touch area TA2 and the touch area(s) TA other than the second touch area TA2 to the first touch area TA1, and determines that the first touch area TA1 is located between the other touch areas TA if the second touch area TA2 and the touch area(s) TA other than the second touch area TA2 are located on the opposite sides to each other, but determines that the first touch area TA1 is not located between the other touch areas TA if the second touch area TA2 and the touch area(s) TA other than the second touch area TA2 are located on the same side. At this time, if the first touch area TA1 is not located between the other touch areas TA, the determiner 15 determines that the display panel 11 is not folded (step S16). On the other hand, if the first touch area TA1 is located between the other touch areas TA, the determiner 15 determines that the display panel 11 is folded (step S17). In this case, the determiner 15 determines that the second touch area TA2 is present in the upside section 11UP of the display panel 11 (step S18).

Figure 4:
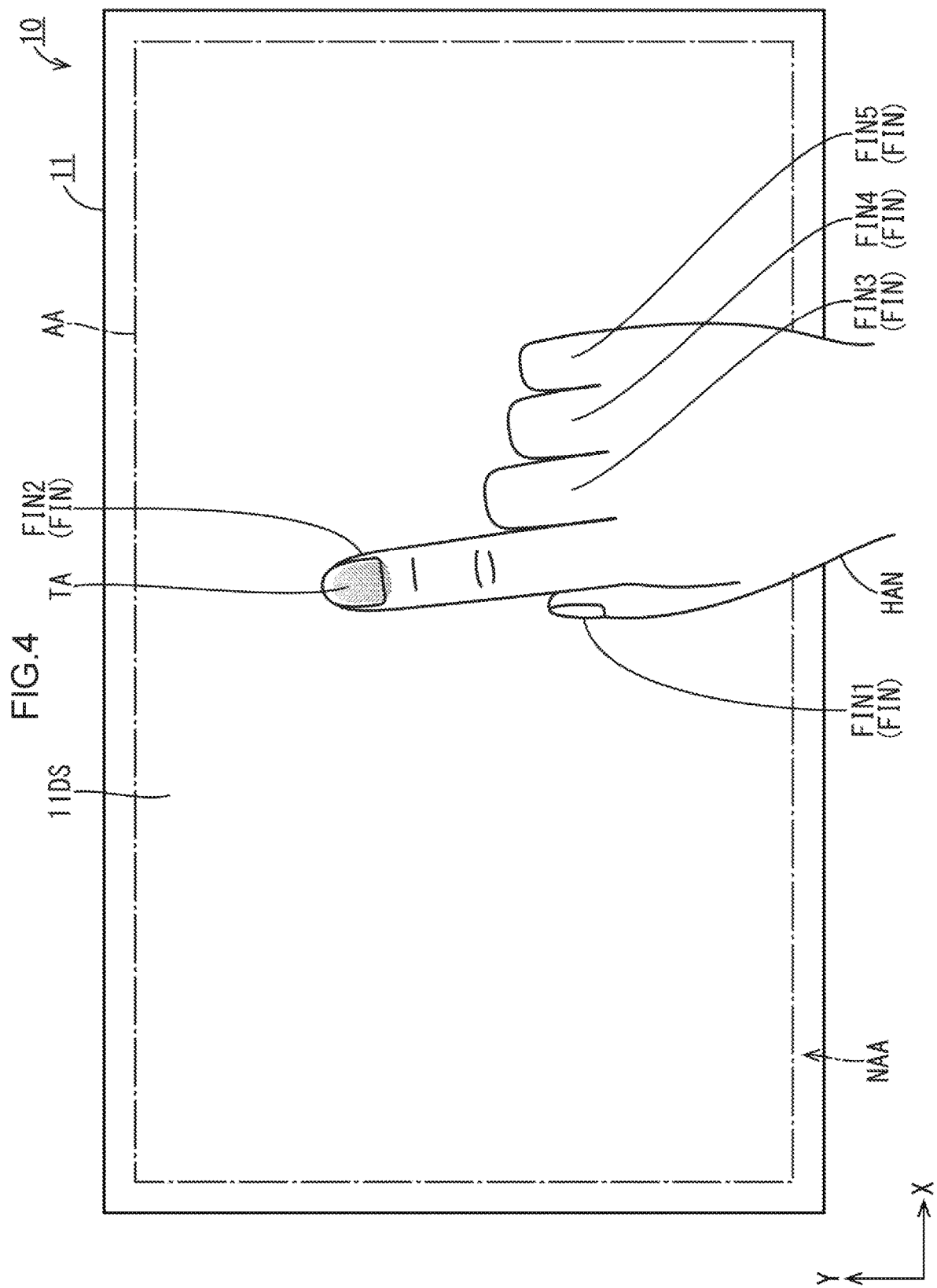
FIG. 4 is a plan view of the display panel illustrating touch operation being performed on the display panel opened.

Specifically, for example, when the user does not fold the display panel 11 but leaves it open and, in that state, performs touch operation by touching the finger FIN to the display screen 11DS, only one or two touch areas TA are detected by the touch detector 12, as shown in FIG. 4. This is because such touch operation is usually performed only by the index finger FIN2 or by the index finger FIN2 and the thumb FIN1. It should be noted that FIG. 4 illustrates a case where the touch operation is performed only by the index finger FIN2. Therefore, according to the flowchart shown in FIG. 3, three or more touch areas TA are not detected at step S11, and therefore the determiner 15 determines that the display panel 11 is not folded (step S16).

Figure 5:
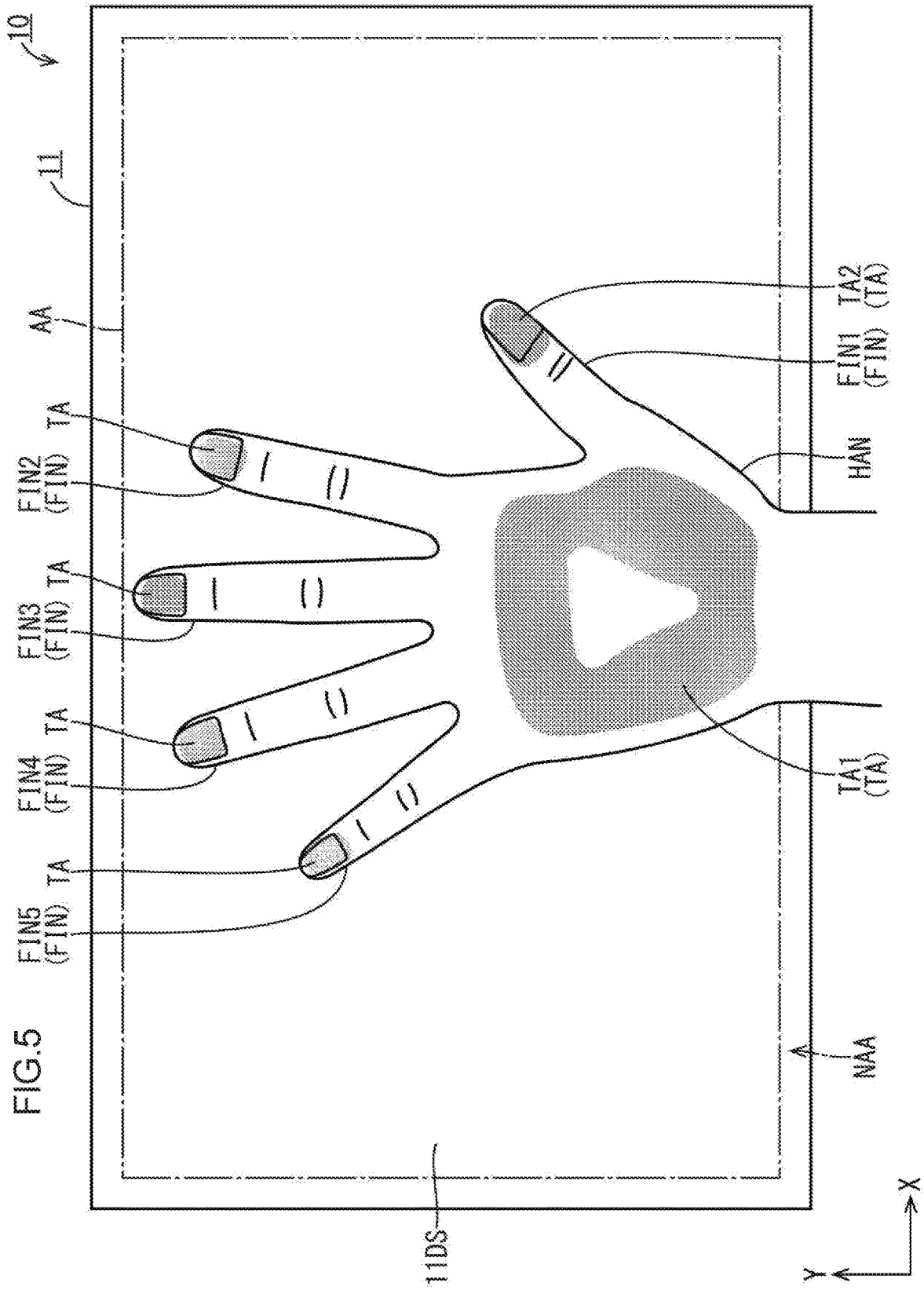
FIG. 5 is a plan view of the display panel illustrating an open hand touching the display panel opened.

In addition to the above case, for example, when the user does not fold the display panel 11 but leaves it open and, in that state, the hand HAN (fingers FIN) in the opened state is touched to the display screen 11DS, the palm PAL and each of the fingers FIN1 to FIN5 individually touch the display screen 11DS, as shown in FIG. 5. With the hand HAN thus opened, each the fingers FIN1 to FIN5 usually extends in an arched shape from the palm PAL side to the fingertip, and therefore only the fingertip touches the display screen 11DS, and the touch area TA is located away from the touch area TA due to the palm PAL. Hence, six touch areas TA are detected by the touch detector 12, and therefore the determination that three or more touch areas are present is made by the determiner 15 at step S11 of the flowchart shown in FIG. 3. Furthermore, the largest first touch area TA1 of the six touch areas TA is due to the palm PAL, the second largest second touch area TA2 is due to the thumb FIN1, and the other four touch areas TA are due to the respective fingers FIN2 to FIN5. This may lead to the determination by the determiner 15 that the first touch area TA1 is located between the other touch areas TA at step S15 of the flowchart shown in FIG. 3. However, with the hand HAN opened, the area of contact of the palm PAL with respect to the display screen 11DS tends to be large, and therefore it is presumed that the size difference between the first touch area TA1 and the other touch areas TA also tends to be large. As compared with a possible minimum value of this difference, the threshold stored in the memory 16 is set to be small. Therefore, at step S14 of the flowchart shown in FIG. 3, the determination that the size difference between the first touch area TA1 and the second touch area TA2 is larger than the threshold is made by the determiner 15, and therefore the determiner 15 determines at step S16 that the display panel 11 is not folded. From the above reason, when the hand HAN in the opened state is touched to the display screen 11DS, even if the first touch area TA1 is located between the other touch areas TA, the event that the display panel 11 is erroneously determined to be folded is unlikely to occur.

Figure 9:
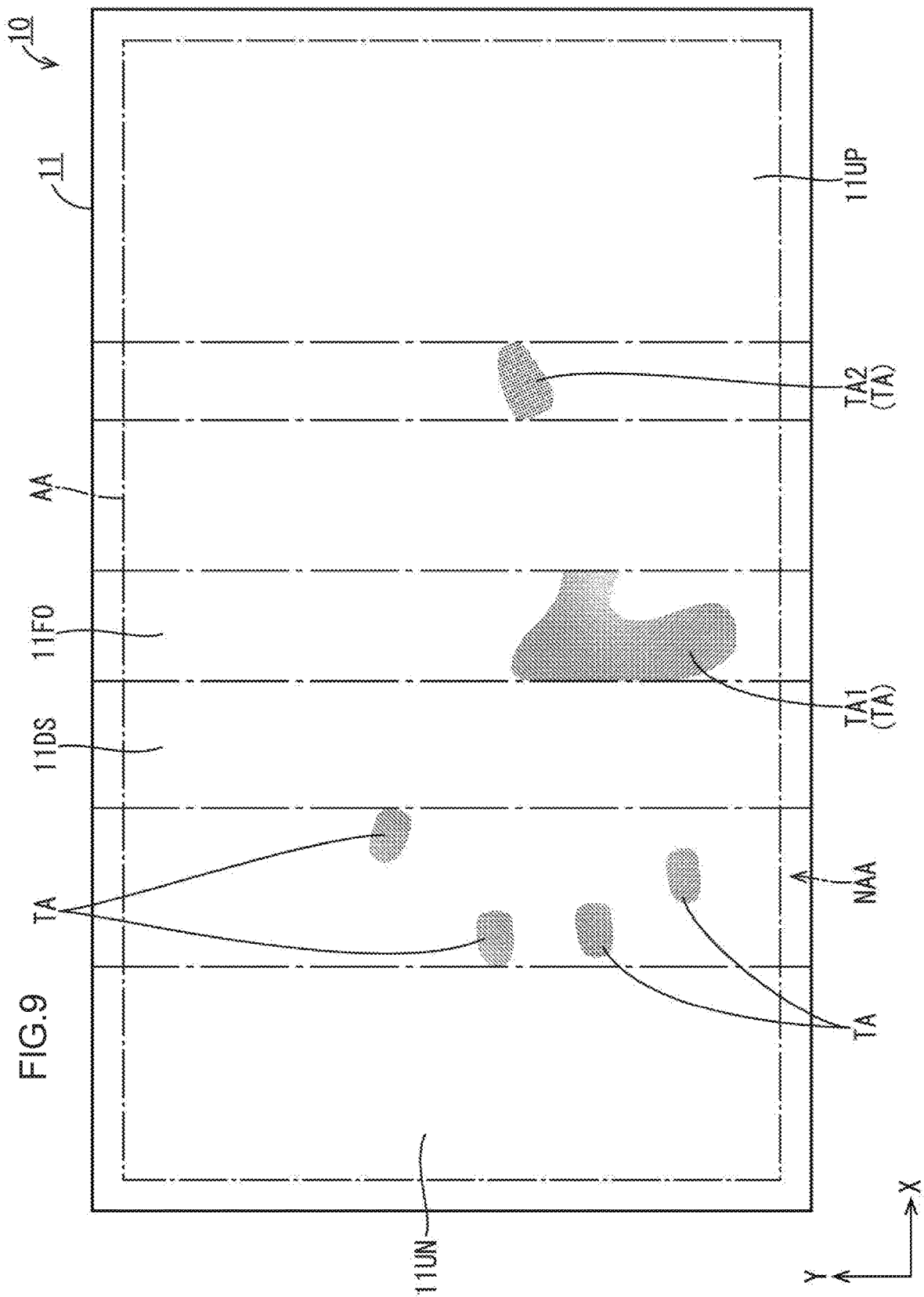
FIG. 9 is a plan view of the display panel illustrating a distribution of each touch area when the central portion of the display panel is held and folded with the hand.

By contrast, when the user holds the display panel 11 with one hand while folding it, the palm PAL, the thumb FIN1, and the other fingers FIN2 to FIN5 touch the folded section 11FO, the upside section 11UP, and the underside section 11UN, respectively, of the display panel 11, as shown in FIGS. 6 to 8. Hence, six touch areas TA are detected by the touch detector 12, and therefore the determination that three or more touch areas TA are present is made by the determiner 15 at step S11 of the flowchart shown in FIG. 3. Furthermore, as shown in FIG. 9, the largest first touch area TA1 of the six touch areas TA is due to the palm PAL, the second largest second touch area TA2 is due to the thumb FIN1, and the other four touch areas TA are due to the respective fingers FIN2 to FIN5. Consequently, the determination that the first touch area TA1 is located between the other touch areas TA is made by the determiner 15 at step S15 of the flowchart shown in FIG. 3. Further, when the user holds the display panel 11 with one hand while folding it, the touch area TA of the palm PAL with respect to the display panel 11 tends to be smaller than the touch area TA of the palm PAL with respect to the display panel 11 when the open hand HAN touches the display screen 11DS without folding the display panel 11 (see FIG. 5). By contrast, the respective touch areas TA of the fingers FIN1 to FIN5 with respect to the display panel 11 have a roughly constant size regardless of how the user touches the display panel 11. Therefore, when the user holds the display panel 11 with one hand while folding it, the size difference between the first touch area TA and the other touch areas TA tends to be small, and therefore, as compared with a possible maximum value of the difference, the threshold stored in the memory 16 is set to be large. Hence, at step S14 of the flowchart shown in FIG. 3, the determination that the size difference between the first touch area TA1 and the second touch area TA2 is equal to or less than the threshold is made by the determiner 15, and therefore at step S17 the determiner 15 determines that the display panel 11 is folded. In this manner, the folded state of the display panel 11 can be properly detected. In addition, by detecting the position of the folded section 11FO on the basis of positional information on the first touch area TA1 due to the palm PAL, it turns out that the user has held and folded a central portion in relation to the x-axis direction of the display panel 11.

Figure 10:
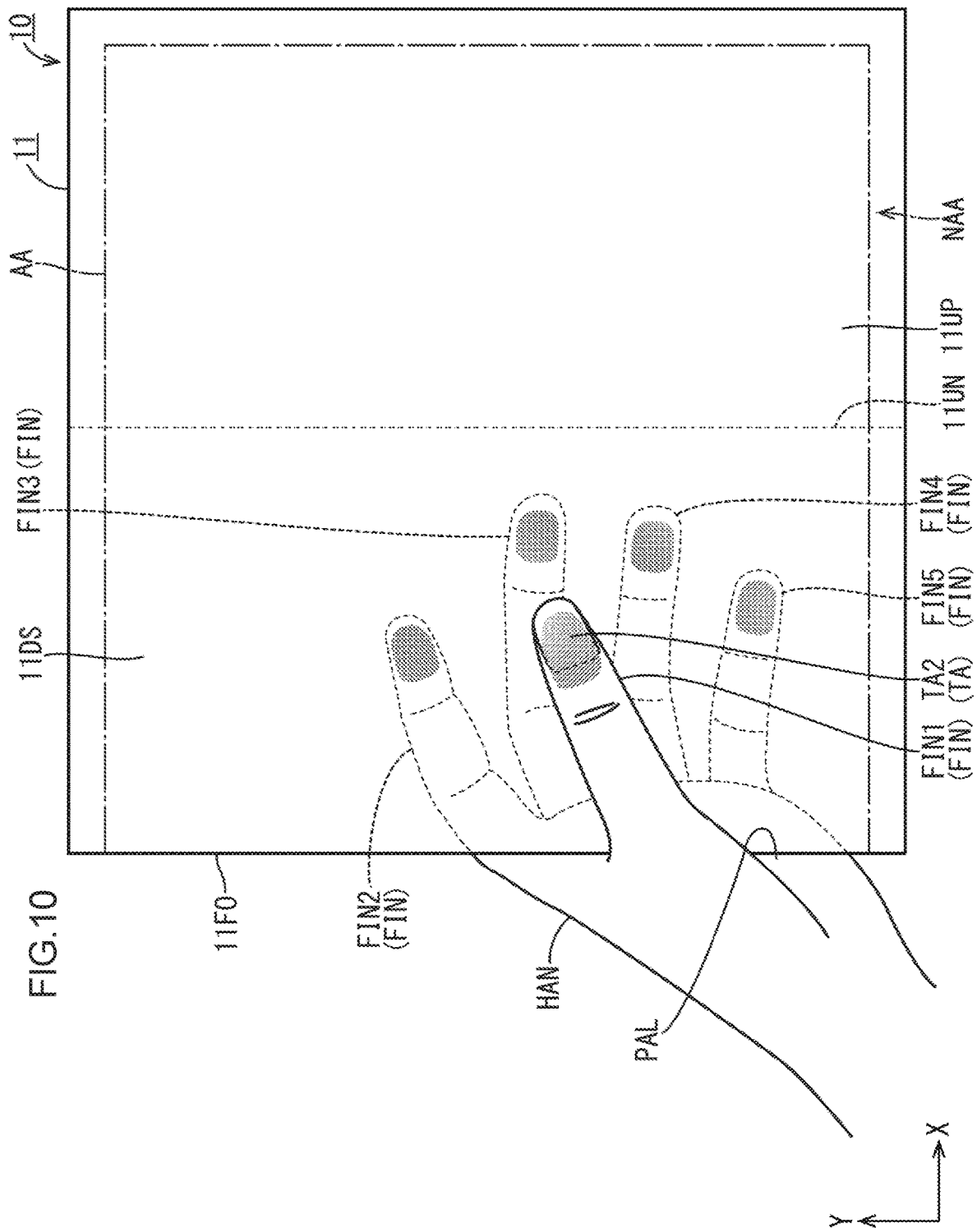
FIG. 10 is a plan view illustrating a user holding and folding an end side portion of the display panel with the user's hand.
Figure 11:
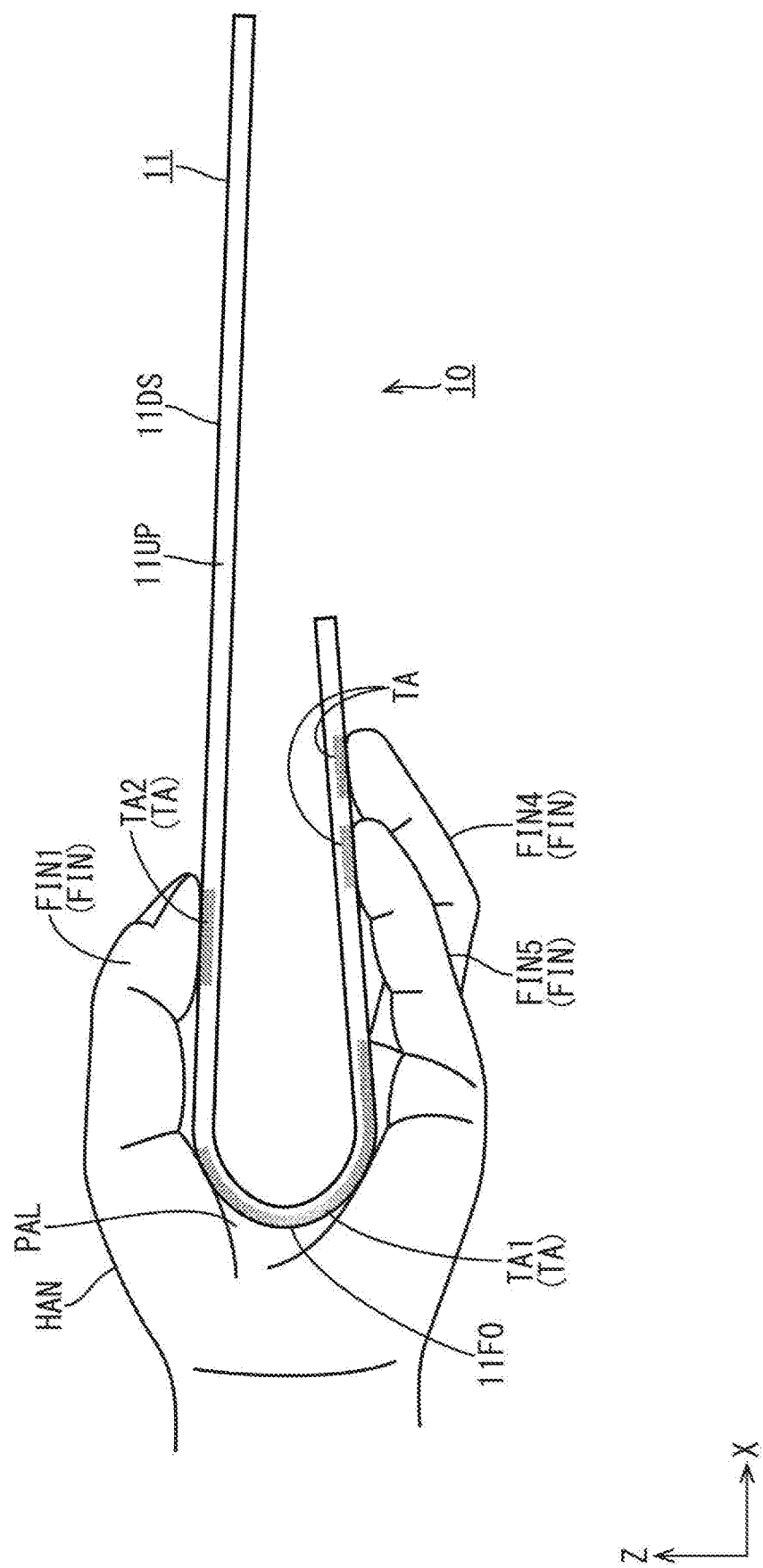
FIG. 11 is a front view illustrating the user holding and folding the end side portion of the display panel with the user's hand.
Figure 12:
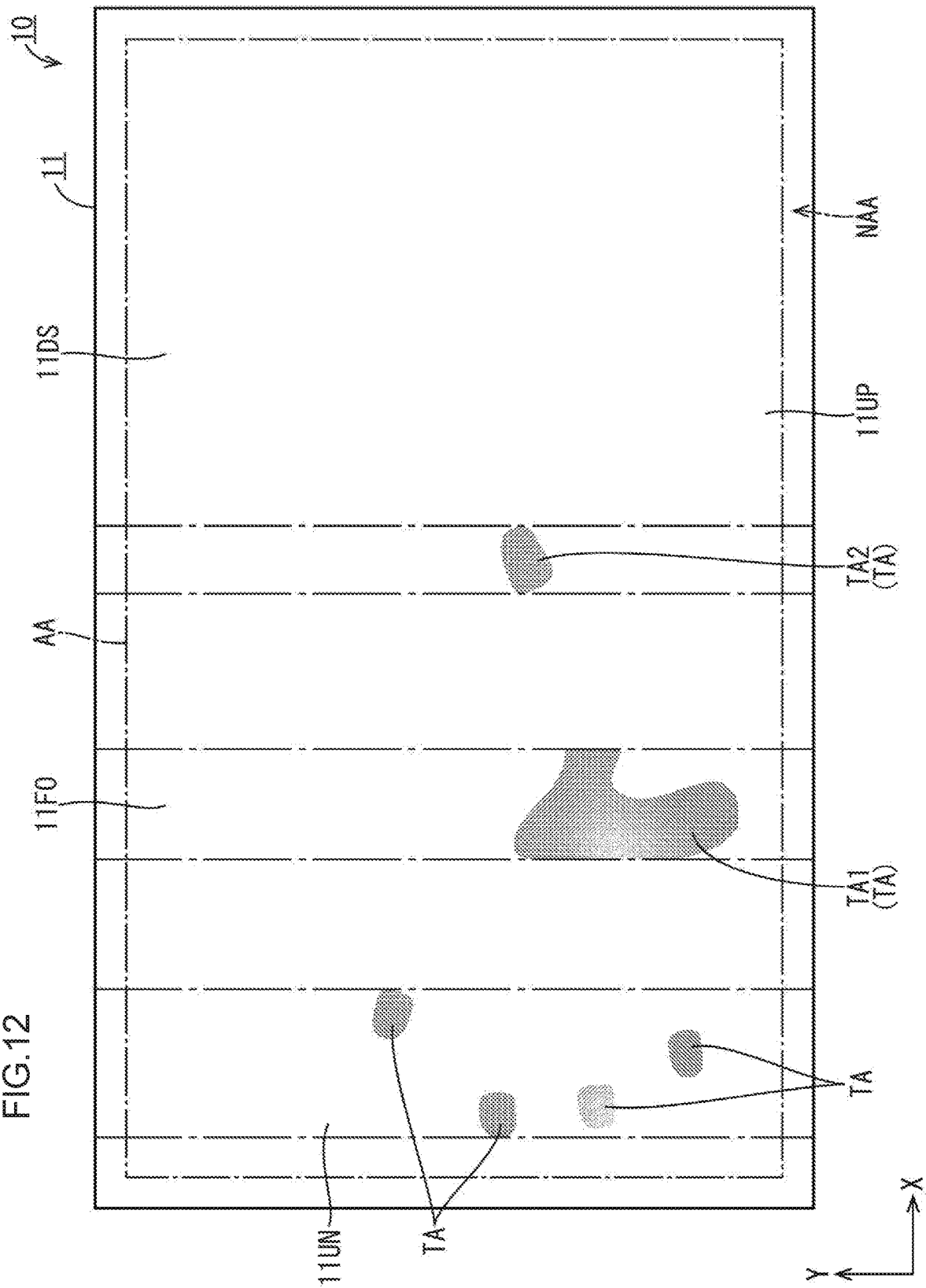
FIG. 12 is a plan view of the display panel illustrating a distribution of each touch area when the end side portion of the display panel is held and folded with the hand.

In addition, when the user holds an end side portion in relation to the x-axis direction of the display panel 11 with one hand while folding it, a difference occurs in area ratio between the upside section 11UP and the underside section 11UN, as shown in FIGS. 10 to 12. FIGS. 10 to 12 illustrates a case where the upside section 11UP is higher in area ratio than the underside section 11UN so that the area of the display screen 11DS viewed by the user will be large. Even in this case, the fact that the user holds the end side portion in relation to the x-axis direction of the display panel 11 can be known by detecting the position of the folded section 11FO on the basis of positional information on the first touch area TA1 due to the palm PAL.

As described above, the display device 10 of the first embodiment is provided with the foldable display panel 11 having flexibility, the touch detector 12 disposed selectively on one panel face side of the display panel 11 and capable of detecting a plurality of touch areas TA, and the determiner 15 for determining that the display panel 11 is folded only if three or more touch areas TA are detected by the touch detector and the largest first touch area TA1 of them is located between the other touch areas TA.

The user may use the display panel 11 having flexibility in the opened state without folding it, or may hold the display panel 11 having flexibility and use it in the folded state. When the user uses the display panel 11 in the opened state without folding it, usually the number of touch areas TA is one or two. In this case, since the number of touch areas TA detected by the touch detector 12 is less than three, the determiner 15 determines that the display panel 11 is not folded. On the other hand, when the user holds the display panel 11 and uses it in the folded state, the fingers FIN are each touching the upside section 11UP and the underside section UN of the display panel 11 between which the folded section 11FO is located, and simultaneously a part of the palm PAL touches or gets close to the vicinity of the folded section 11FO. In this state, three or more touch areas TA are detected by the touch detector 12 and, of these touch areas TA, the vicinity of the folded section 11FO that the part of the palm PAL touches or gets close to is the largest first touch area TA1. Furthermore, the first touch area TA1 is located between the touch area TA due to the finger FIN in the upside section 11UP and the touch area TA due to the finger FIN in the underside section 11UN. In this case, three or more touch areas TA are detected by the touch detector 12, and the largest first touch area TA1 of these is located between the other touch areas TA, so that the determiner 15 determines that the display panel 11 is folded. In this manner, whether or not the display panel 11 is folded can be properly distinguished. Further, since the touch detector 12 is selectively disposed on one panel face side of the display panel 11, as compared with the conventional case where the touchscreens are provided on both the front and back faces, respectively, of the display panel 11, it is suitable in terms of achieving lower power consumption, and moreover, required arithmetic processing performance associated with touch detection or the like is also low.

In addition, the determiner 15 determines that the display panel 11 is folded only if the size difference or ratio of the first touch area TA1 from/to the second largest second touch area TA2 of the three or more touch areas TA detected by the touch detector 12 is equal to or less than the threshold. When the user touches the fingers FIN spread, together with the palm PAL, to the display panel 11 with the display panel 11 unfolded and opened, the positional relation may be such that the first touch area TA1 is located between the other touch areas TA. In this case, the touch area TA of the palm PAL with respect to the display panel 11 tends to be wider than the touch area TA of the palm PAL with respect to the display panel 11 when the display panel 11 is folded. By contrast, the touch area TA of the finger FIN with respect to the display panel 11 has a roughly constant size regardless of how the user holds the display panel 11. Therefore, the determiner 15 determines that the display panel 11 may be unfolded if the size difference or ratio of the first touch area TA1 from/to the second touch area TA2 exceeds the threshold, but determines that the display panel 11 is folded if the size difference or ratio is equal to or less than the threshold. This can make unlikely the event that the display panel 11 is erroneously determined to be folded despite the unfolded and opened state of the display panel 11.

In addition, the determiner 15 determines that the second largest second touch area TA2 of the three or more touch areas TA detected by the touch detector 12 is present in the upside section 11UP disposed on the front side with respect to the folded section 11FO of the display panel 11. In this case, when the user holds the display panel 11 and uses it in the folded state, usually the thumb FIN1 touches the upside section 11UP disposed on the front side with respect to the folded section 11FO of the display panel 11. The thumb FIN1 has a narrower touch area TA with respect to the display panel 11 than the palm PAL, but has a larger touch area TA with respect to the display panel 11 than any other fingers FIN. Therefore, since the second largest second touch area TA2 of the three or more touch areas TA detected by the touch detector 12 is due to the touch of the thumb FIN1, the determination that the second touch area TA2 is present in the upside section 11UP disposed on the front side with respect to the folded section of the display panel 11 is made by the determiner 15.

In addition, the touch detector 12 is composed of a capacitive touchscreen pattern TP. This enables the input of the touch area TA from the user to be detected on the basis of a change in capacitance occurring between the user and the touchscreen pattern TP.

Second Embodiment

A second embodiment of the present invention will be described with reference to FIGS. 13 to 17. In the second embodiment, the display device 10 that detects a hover touch area HTA is illustrated. It should be noted that redundant descriptions of a similar structure, action and effect to those of the first embodiment described above will be omitted.

Figure 13:
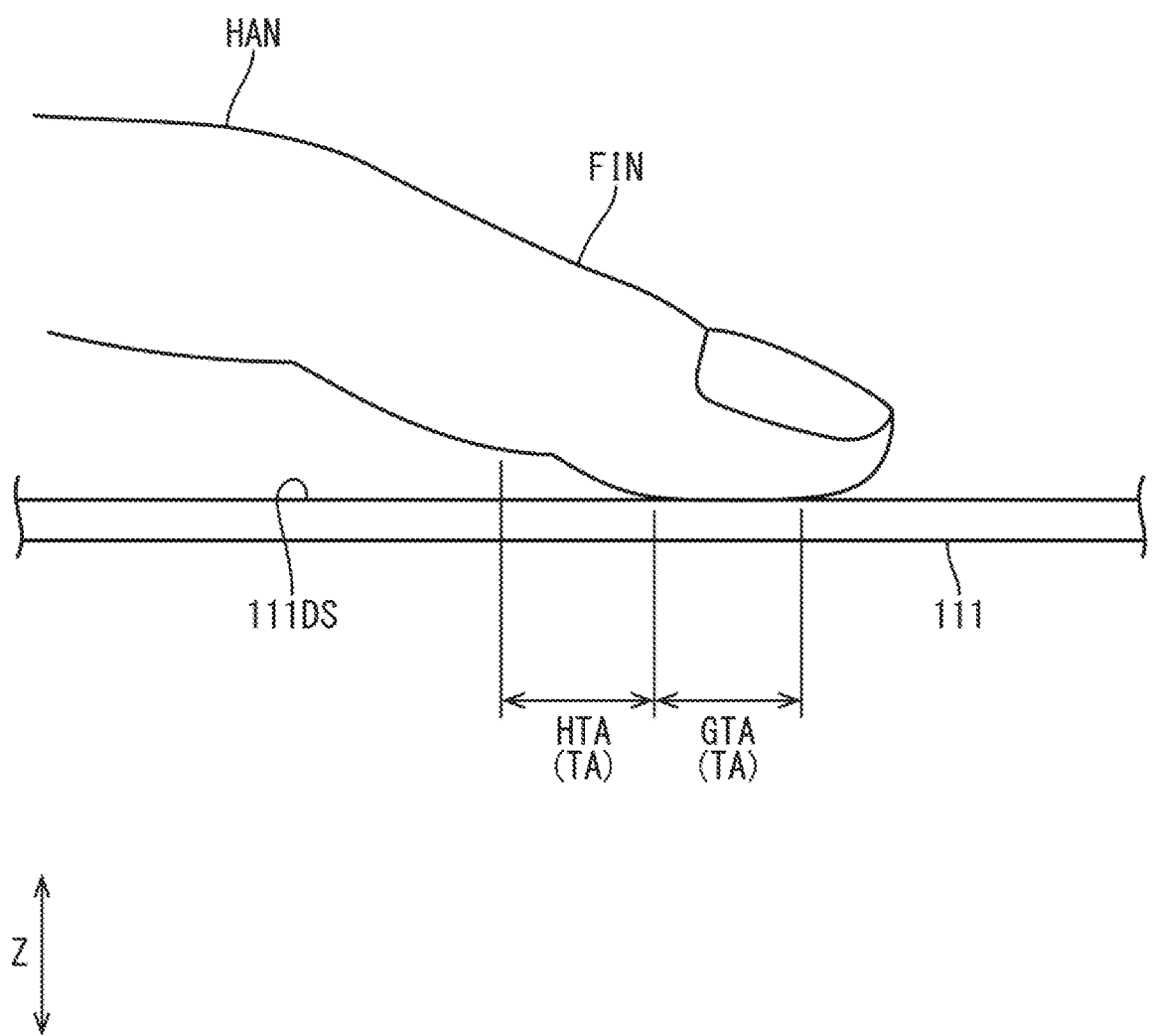
FIG. 13 is a side view illustrating a finger touching a display panel according to a second embodiment of the present invention.

The touch detector 12 (see FIG. 2) according to the second embodiment detects not only a "genuine touch area GTA" that is a touch area TA where the hand HAN of the user directly touches a display screen 111DS of a display panel 111, but also a touch area TA "hover touch area HTA" where the hand HAN of the user does not touch but gets close to the display screen 111DS, as shown in FIG. 13. In the second embodiment, the touch controller 14 (see FIG. 2) can extract a detection intensity of the touch area TA detected by the touch detector 12. In detail, the detection intensity of the touch area TA extracted by the touch controller 14 tends to be inversely proportional to a distance of the hand HAN of the user from the display screen 111DS of the display panel 111. Specifically, if the hand HAN of the user is touching the display screen 111DS and therefore the above distance is zero, the detection intensity of the touch area TA is maximum. Conversely, if the hand HAN is not touching the display screen 111DS and the above distance is more than zero, the detection intensity of the touch area TA is lower than the maximum value, and the detection intensity of the touch area TA becomes lower as the above distance increases. Therefore, in the second embodiment, the maximum value of the detection intensity of the touch area TA or a value smaller than the maximum value is set as a threshold serving as a reference for distinguishing the genuine touch area GTA and the hover touch area HTA. Further, the determiner 15 (see FIG. 2) determines whether the touch area TA is the genuine touch area GTA or the hover touch area HTA by comparing the detection intensity extracted by the touch controller 14 with the threshold. Furthermore, if both the genuine touch area GTA and the hover touch area HTA are present, the determiner 15 determines the posture of the finger FIN of the user in the panel face of the display screen 111DS on the basis of a positional relation between the genuine touch area GTA and the hover touch area HTA.

Figure 14:
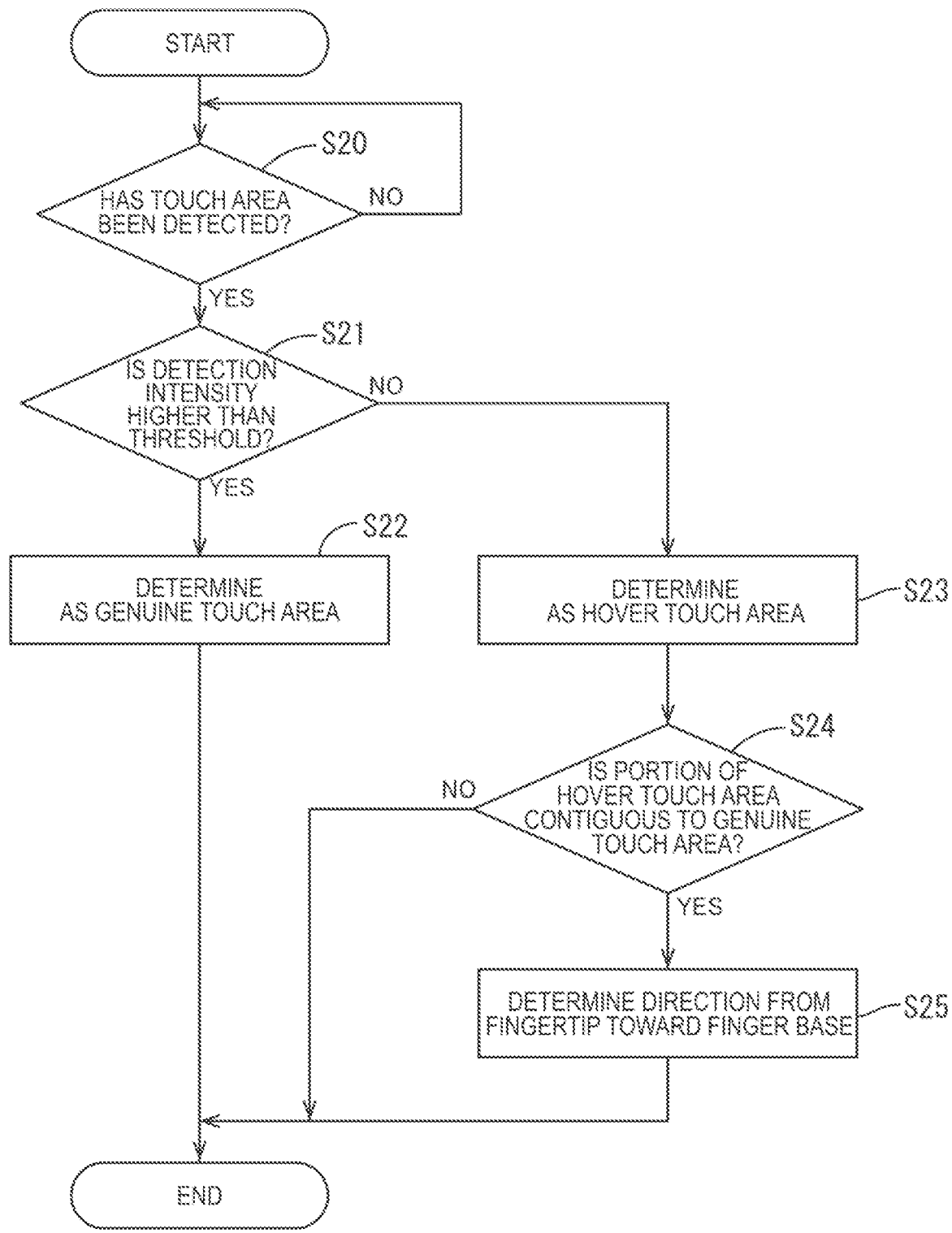
FIG. 14 is a flowchart illustrating a procedure for classifying the touch area as a genuine touch area or as a hover touch area.
Figure 17:
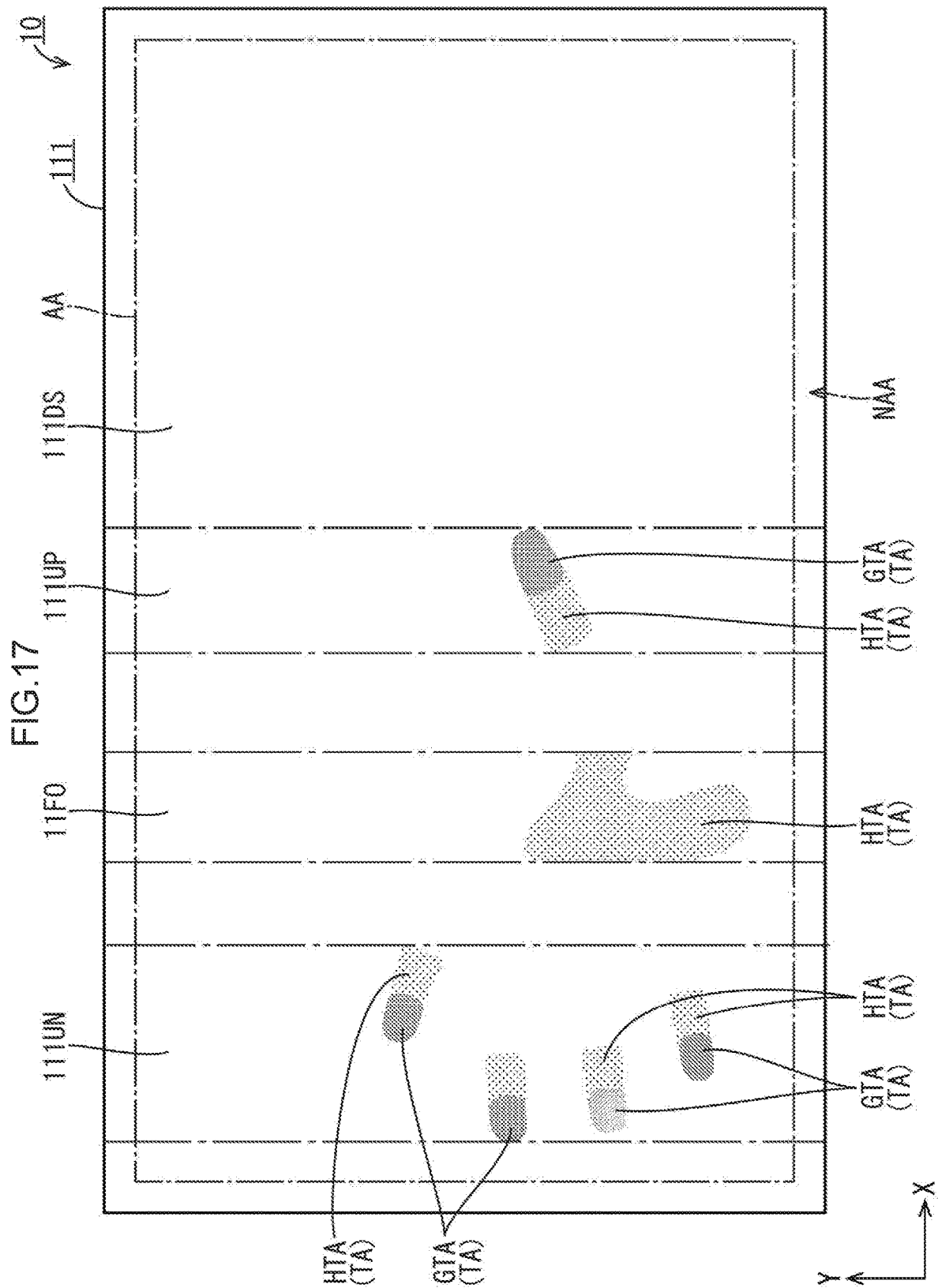
FIG. 17 is a plan view of the display panel illustrating a distribution of each touch area when the end side portion of the display panel is held and folded with the hand and when the palm of the hand does not touch the display screen.

Next, a specific procedure for the determiner 15 determining the kind of the touch area TA will be described with reference to a flowchart shown in FIG. 17. First, the determiner 15 performs processing for determining whether or not the touch area TA has been detected by the touch detector (step S20), as shown in FIG. 14. At this time, if the touch area TA has not been detected, the procedure returns to step S20. On the other hand, if the touch area TA has been detected, the determiner 15 performs processing for determining whether or not the detection intensity of the touch area TA extracted by the touch controller 14 is higher than the threshold (step S21). At this time, if the detection intensity of the touch area TA is higher than the threshold, the determiner 15 determines that the touch area TA is the genuine touch area GTA (step S22). On the other hand, if the detection intensity of the touch area TA is lower than the threshold, the determiner 15 determines that the touch area TA is the hover touch area HTA (step S23). Thereafter, the determiner 15 performs processing for determining whether or not a portion of an outer peripheral edge of the hover touch area HTA is contiguous to the genuine touch area GTA (step S24). At this time, if a portion of the outer peripheral edge of the hover touch area HTA is contiguous to the genuine touch area GTA, the determiner 15 determines that the hover touch area HTA and the genuine touch area GTA contiguous to each other are due to the finger FIN of the user and that a direction from the genuine touch area GTA toward the hover touch area HTA is a direction from the fingertip toward the base of the finger FIN (step S25).

Figure 15:
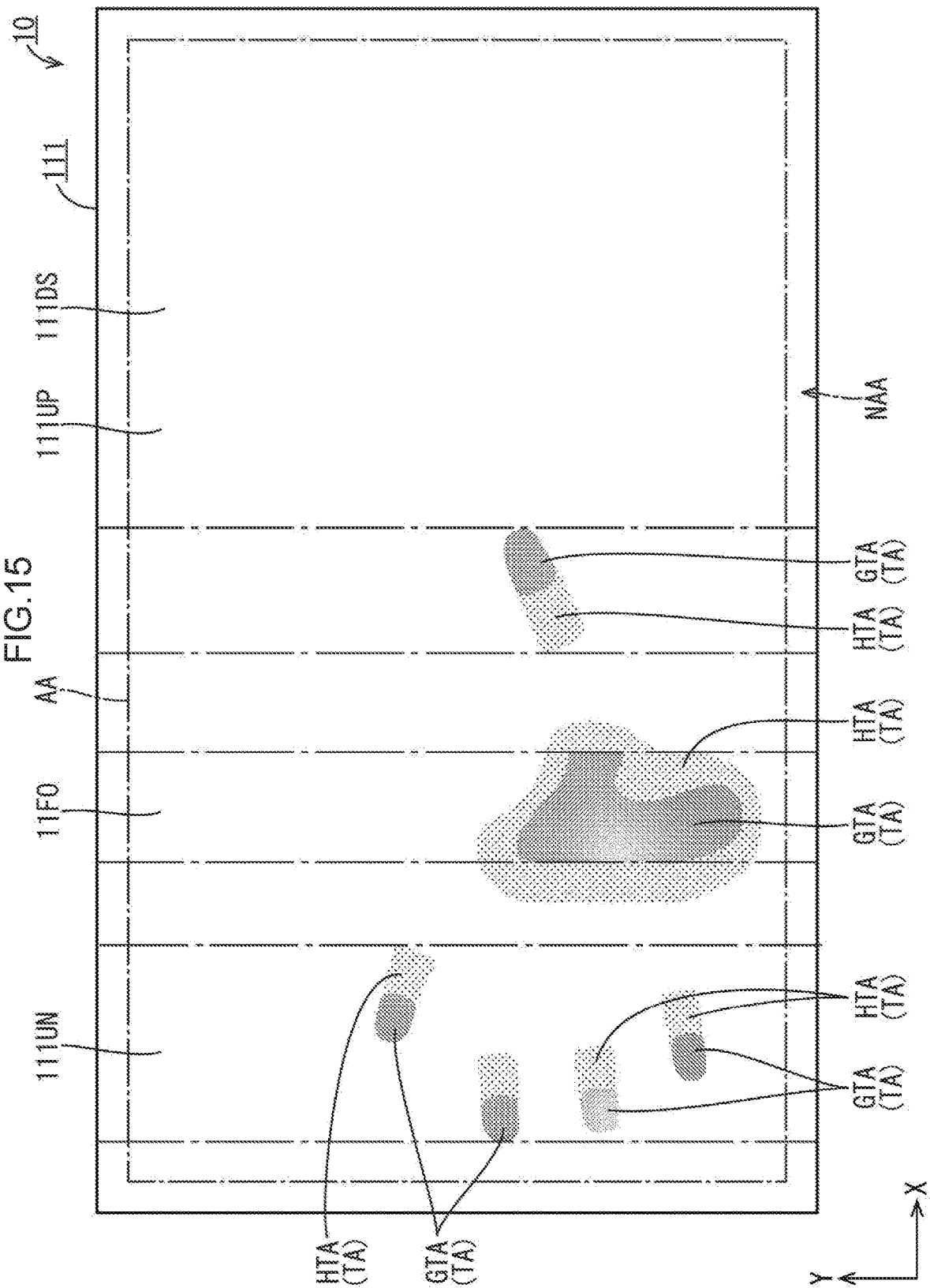
FIG. 15 is a plan view of the display panel illustrating a distribution of each touch area when the end side portion of the display panel is held and folded with the hand and when the palm of the hand touches a display screen.
Figure 16:
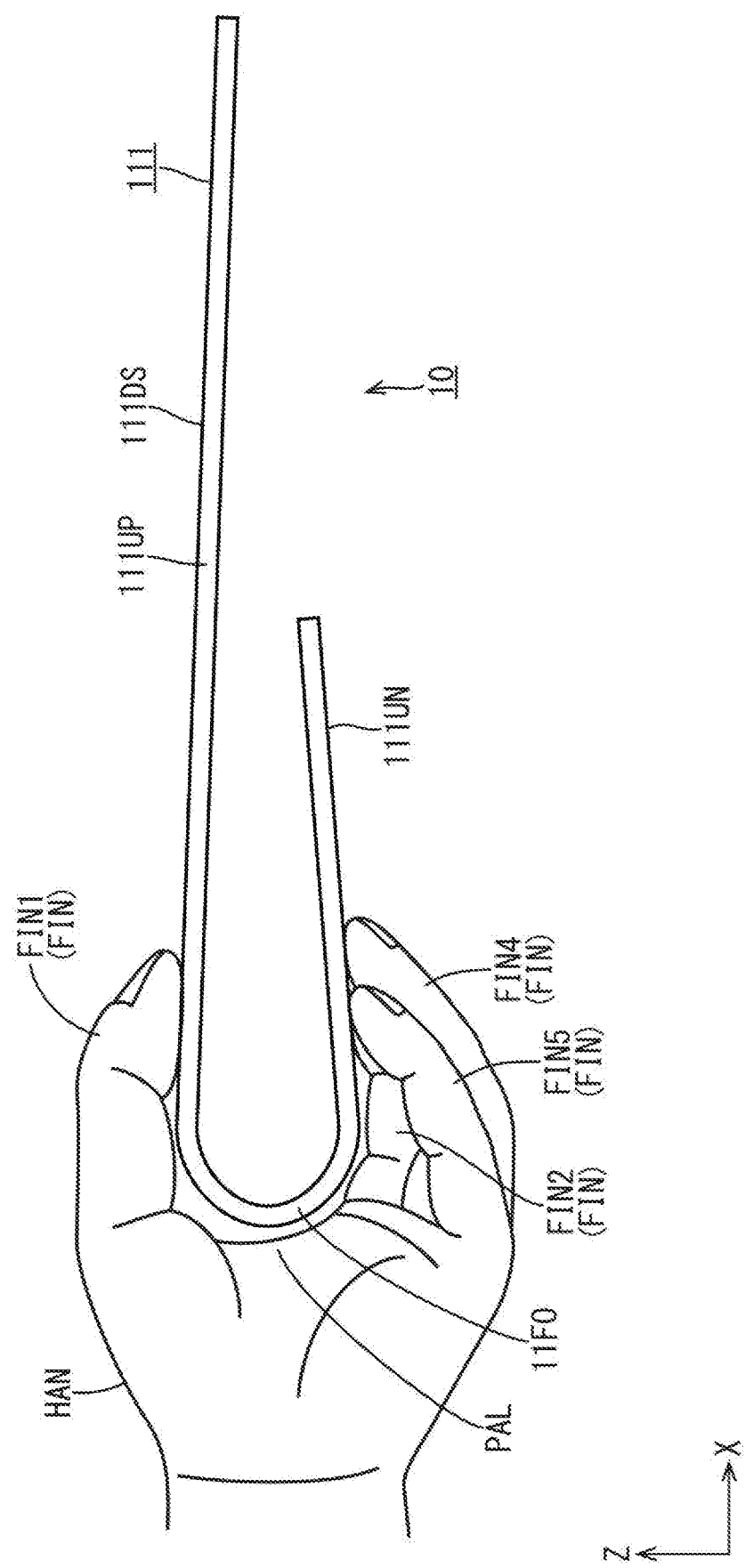
FIG. 16 is a side view of the display panel when the end side portion of the display panel is held and folded with the hand and when the palm of the hand does not touch the display screen.

Specifically, each touch area TA when the user holds the display panel 111 with the hand HAN while folding it is distributed as shown in FIG. 15. It should be noted that, in FIGS. 15 and 17, the genuine touch area GTA and the hover touch area HTA are shown by hatching lines differently. FIG. 15 illustrates a case where the palm PAL touches the display screen 111DS. In this case, an annular hover touch area HTA is present adjoiningly around the genuine touch area GTA touching the palm PAL in the display screen 111DS. On the other hand, the hover touch areas TA are present adjoiningly on the palm PAL side of the genuine touch areas GTA touching the fingers FIN1 to FIN5 in the display screen 111DS. Therefore, at step S24 of the flowchart shown in FIG. 14, since the genuine touch area GTA associated with the palm PAL has an outer peripheral edge contiguous to the hover touch area HTA along substantially the entire periphery, "NO" is determined by the determiner 15. On the other hand, at the same step S24, since the genuine touch area GTA associated with each of the fingers FIN1 to FIN5 has the outer peripheral edge only partially contiguous to the hover touch area HTA, "YES" is determined by the determiner 15. Further, at step S25 of the flowchart shown in FIG. 14, on the basis of positional relations between the genuine touch areas GTA and the hover touch areas HTA associated with the respective fingers FIN1 to FIN5, the directions from the fingertips toward the bases of the respective fingers FIN1 to FIN5 are each determined by the determiner 15.

By contrast, when the user holds the display panel 111 with one hand HAN while folding it, each touch area TA when the palm PAL does not touch the display screen 111DS is distributed as shown in FIG. 15. According to FIG. 16, an area overlapping with a portion located at a predetermined distance or at a distance shorter than the predetermined distance from the display screen 111DS of the palm PAL is the hover touch area HTA. In this case, at step S21 of the flowchart shown in FIG. 14, since the detection intensity of the touch area TA associated with the determiner 15 is lower than the threshold, it is determined as the hover touch area HTA by the determiner 15. It should be noted that the determination of the touch area TA associated with each of the fingers FIN1 to FIN5 is as described above. In this manner, even if the palm PAL does not touch the display screen 111DS, the hover touch area HTA is detected as the touch area TA associated with the palm PAL, so that the processing based on the flowchart illustrated in the above first embodiment and shown in FIG. 3 is performed, and thereby whether or not the display panel 111 is folded can be properly determined.

As described above, according to the second embodiment, the touch controller 14 for controlling detection of the touch area TA performed by the touch detector 12 and also extracting the detection intensity of the touch area TA is provided, and the determiner 15 determines as the genuine touch area GTA where the hand HAN that is a touch inputter for inputting the touch area TA touches the display panel 111 if the detection intensity extracted by the touch controller 14 is higher than the threshold, or determines as the hover touch area HTA where the hand HAN that is a touch inputter is not touching but close to the display panel 111 if the detection intensity extracted by the touch controller 14 is lower than the threshold. The detection intensity of the touch area TA extracted by the touch controller 14 tends to be inversely proportional to the distance of the hand HAN that is the touch inputter from the display panel 111. By utilizing this, it can be determined by the determiner 15 whether the touch area TA detected by the touch detector 12 is the genuine touch area GTA where the hand that is the touch inputter touches the display panel 111 or the hover touch area HTA where the hand that is the touch inputter does not touch but gets close to the display panel 111. In this manner, how the user holds the display panel 111, or the like, can be known on the basis of the distribution of the genuine touch area GTA and the hover touch area HTA determined by the determiner 15. It should be noted that the above hand HAN which is the touch inputter includes the fingers FIN, the palm PAL, and the like, of the user. In addition, as compared with a conventional art that can only distinguish the front side section and the back side section on the basis of how large the area of contact of the finger FIN is when the user folds and holds the display panel, how the user holds the display panel 111, or the like, can be distinguished on the basis of the distribution, or the like, of the genuine touch area GTA and the hover touch area determined by the determiner 15, as described above, and the front side section 111UP and the underside section 111UN can also be distinguished more properly.

In addition, if a portion of the outer peripheral edge of the genuine touch area GTA is contiguous to the hover touch area HTA, the determiner 15 determines that the touch inputter is the finger FIN of the user and that the direction from the genuine touch area GTA toward the hover touch area HTA is the direction toward the base of the finger FIN. When the tip of the finger FIN of the user touches the display panel 111, a base side portion of the finger FIN adjoining the fingertip does not touch but gets close to the display panel 111. In this case, the touch controller 14 extracts the genuine touch area GTA and the hover touch area HTA contiguous to the portion of the outer peripheral edge of the genuine touch area GTA, and therefore the determiner 15 determines that the touch inputter is the finger FIN of the user and that the direction from the genuine touch area GTA toward the hover touch area HTA is the direction toward the base of the finger FIN. Thereby, how the user holds the display panel 111, or the like, can be more accurately known regardless of the posture of the user holding the display panel 111, as compared with a case where the posture of the display panel 111 is detected, for example, by using a gyrosensor.

Third Embodiment

A third embodiment of the present invention will be described with reference to FIG. 18 or 19. In the third embodiment, the display device 10 having the display controller modified from the first embodiment described above is illustrated. It should be noted that redundant descriptions of a structure, an action, and an effect similar to those of the first embodiment described above will be omitted.

Figure 18:
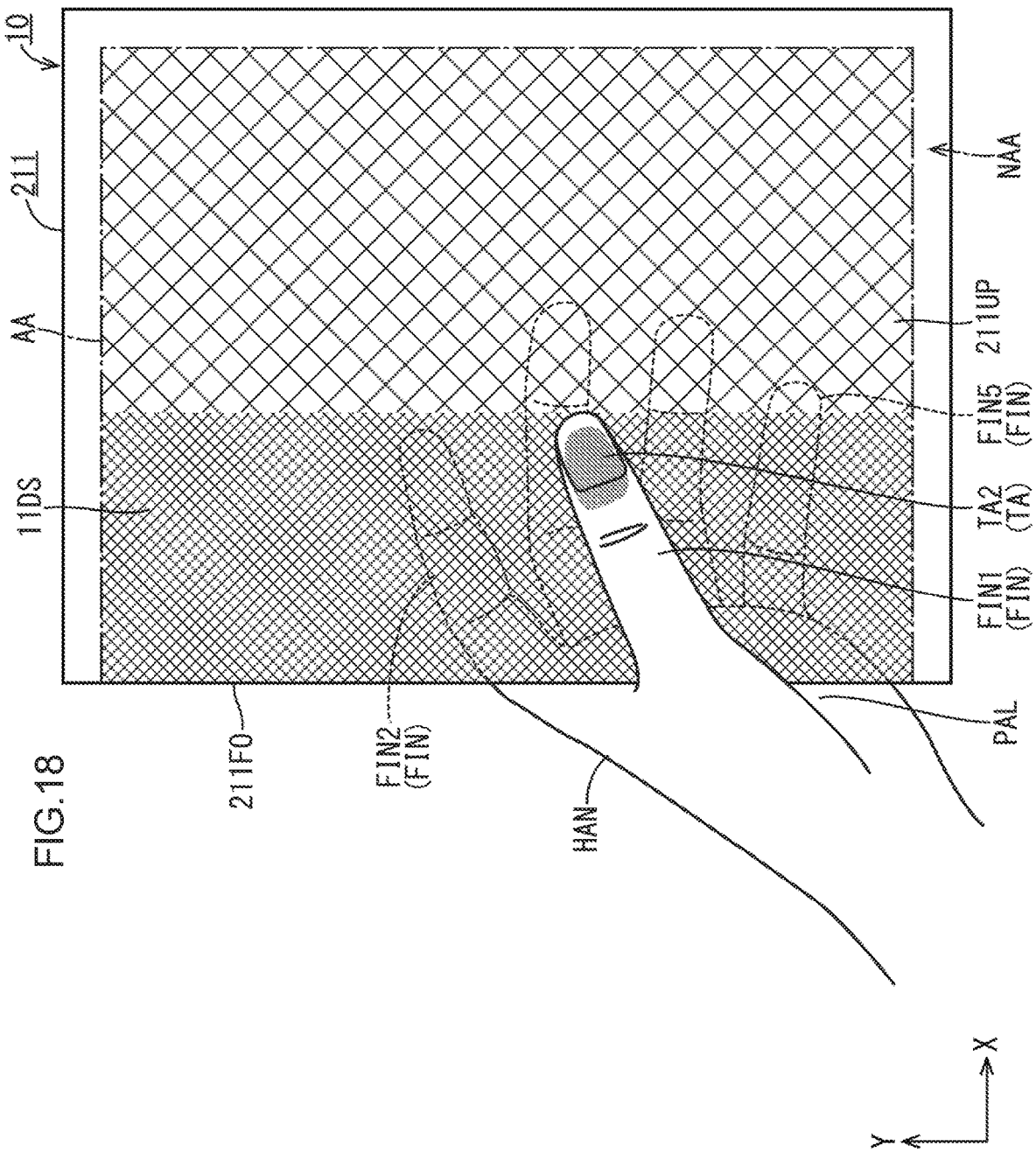
FIG. 18 is a plan view illustrating the user holding and folding the central portion of the display panel with the user's hand according to a third embodiment of the present invention.
Figure 19:
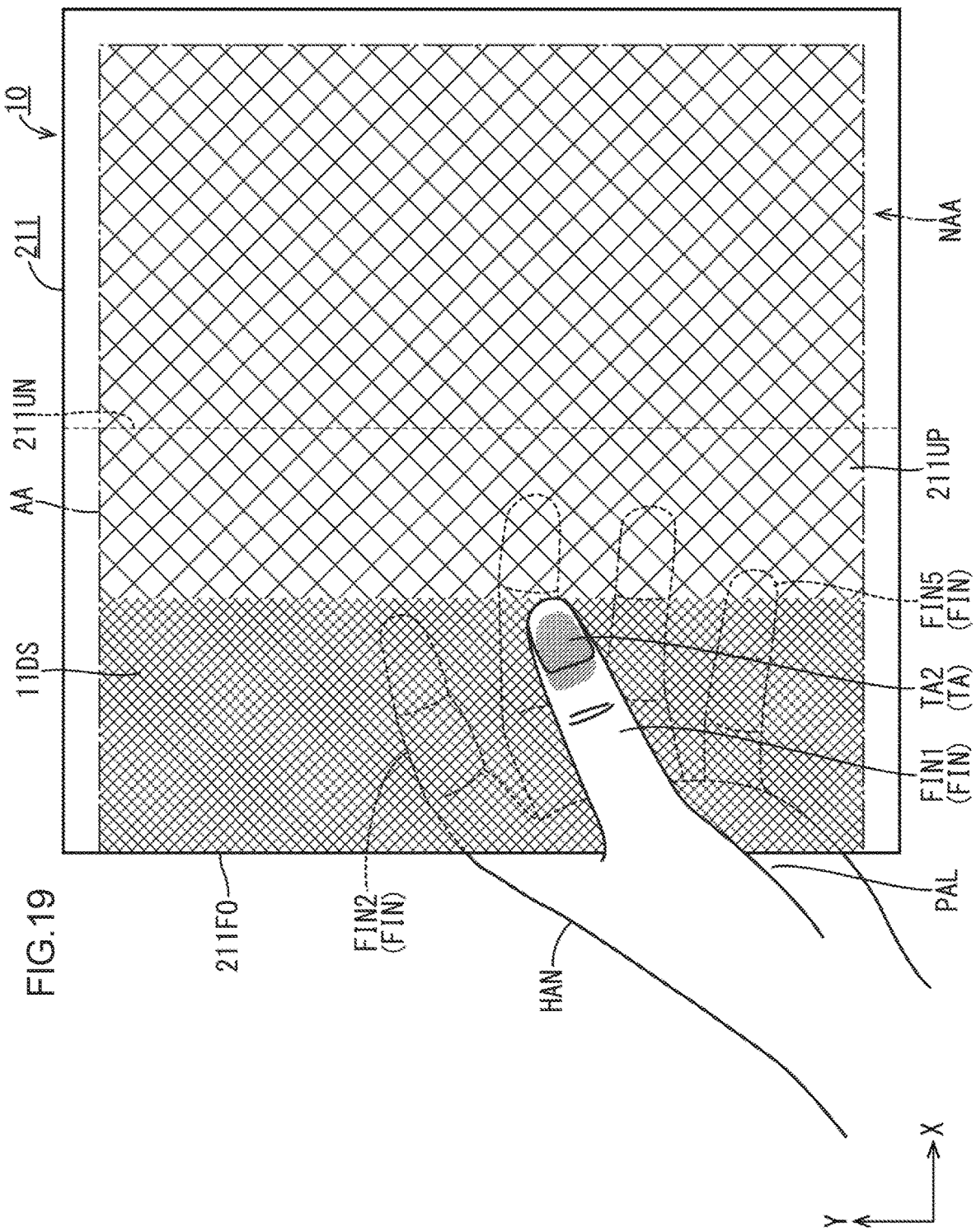
FIG. 19 is a plan view illustrating the user holding and folding the end side portion of the display panel with the user's hand.

The display controller 13 (see FIG. 2) according to the third embodiment displays an image on a portion of a upside section 211UP of a display panel 211, but makes an image undisplayed on a folded section 211FO and a underside section 211UN of the display panel 211, as shown in FIG. 18. It should be noted that, in FIGS. 18 and 19, an area where an image is displayed is shown by hatching lines densely, and an area where an image is not displayed is shown by hatching lines sparsely. In detail, the display controller 13 displays an image on a portion of the upside section 211UP of the display panel 211 outside the second touch area TA2 that is the touch area TA due to the thumb FIN1, but makes an image undisplayed at least on the second touch area TA2 of the upside section 211UP of the display panel 211. More specifically, in the third embodiment, the display controller 13 displays an image on a portion of the upside section 211UP of the display panel 211 on the opposite side to the first touch area side with respect to the second touch area TA2 in relation to the x-axis direction, that is, on the right side in FIG. 18, but makes an image undisplayed on a portion other that the above portion of the upside section 211UP of the display panel 211. Thus, since an image is displayed on a portion of the upside section 211UP by the display controller 13, the user can view the image. On the other hand, since an image is made undisplayed by the display controller 13 on the folded section 211FO and the underside section 211UN on which the user cannot easily view an image, it is suitable in terms of achieving low power consumption. Besides, since an image is displayed only on a portion of the upside section 211UP that is not visually obstructed by the thumb FIN1 of the upside section 211UP, but an image is displayed on a portion of the upside section 211UP that is visually obstructed by the thumb FIN1, optimization of image visibility is achieved and simultaneously further reduction in power consumption is achieved.

Besides, when the user changes the position of the folded section 211FO of the display panel 211, the image display area is changed by the display controller 13 according to the position of the folded section 211FO changed. Specifically, when the user folds and holds the end side portion of the display panel 211, the display controller 13 displays an image over a wide area as compared with the case where the central portion of the display panel 211 is folded (see FIG. 18), as shown in FIG. 19. In this case, again, the image is not played on a portion other than the portion of the upside section 211UP of the display panel 211 on the opposite side to the first touch area TA1 with respect to the second touch area TA2 in relation to the x-axis direction. In this manner, when the user holds the display panel 211 in the folded state, the image display area is controlled by the display controller 13 using the position of the thumb FIN1 as a reference.

As described above, according to the third embodiment, the display controller 13 for controlling display of an image on the display panel 211 is provided, and the display controller 13 displays an image on at least a portion of the upside section 211UP of the display panel 211, but makes an image undisplayed on the folded section 211FO and the underside section 211UN disposed on the back side thereof of the display panel 211. Thus, since the upside section 211UP of the display panel 211 faces the user, by making the display controller 13 display an image on at least a portion of the upside section 211UP, the image can be viewed by the user. On the other hand, since the image is made undisplayed by the display controller 13 on the folded section 211FO and the underside section 211UN of the display panel 211 that are unlikely to be viewed by the user, it is suitable in terms of achieving low power consumption.

In addition, the display controller 13 displays an image outside the second touch area TA2 of the upside section 211UP, but makes an image undisplayed on the second touch area TA2. Thus, it is presumed that the finger FIN of the user does not touch the outside of the second touch area TA2 of the upside section 211UP of the display panel 211, and therefore, by making the display controller 13 display an image there, the image can be viewed effectively by the user. On the other hand, since the thumb FIN1 of the user touches the second touch area TA2 in the upside section 211UP, even if an image is displayed there, it is difficult to view the image, and therefore an image is made undisplayed by the display controller 13, and thereby further reduction in power consumption can be achieved.

Fourth Embodiment

A fourth embodiment of the present invention will be described with reference to FIG. 20 or FIG. 21. In the fourth embodiment, the display device 10 having the touch controller modified from the first embodiment described above is illustrated. It should be noted that redundant descriptions of a structure, an action, and an effect similar to those of the first embodiment described above will be omitted.

Figure 20:
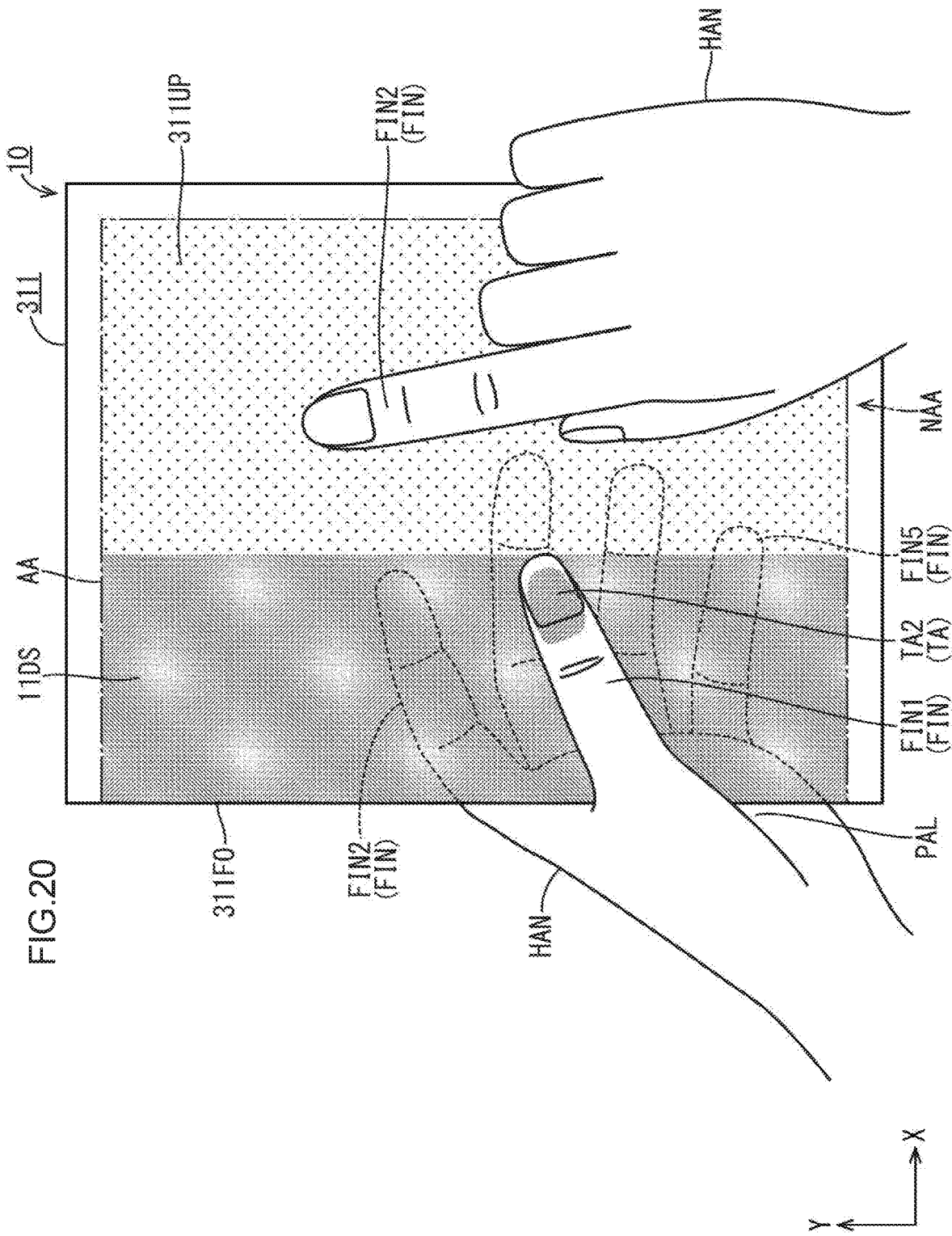
FIG. 20 is a plan view illustrating the user holding and folding the central portion of the display panel with the user's hand according to a fourth embodiment of the present invention.
Figure 21:
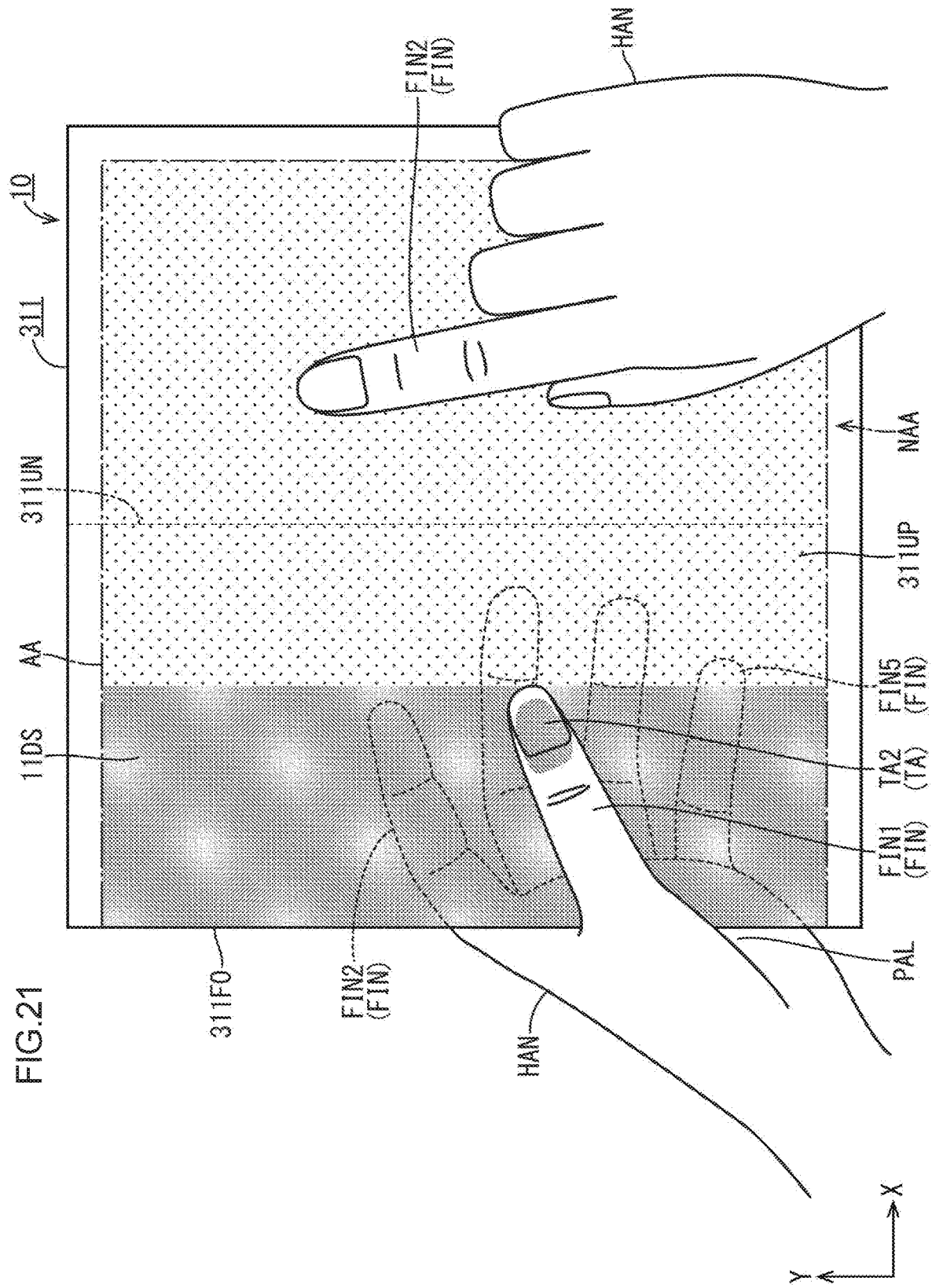
FIG. 21 is a plan view illustrating the user holding and folding the end side portion of the display panel with the user's hand.

The touch controller 14 (see FIG. 2) according to the fourth embodiment activates detection of a new touch area TA in a portion of a upside section 311UP of a display panel 311, but deactivates detection of a new touch area TA in a folded section 311FO and a underside section 311UN of the display panel 311, as shown in FIG. 20. It should be noted that, in FIGS. 20 and 21, an area where detection of the touch area TA is activated is shown in a sparse dots pattern, and an area where detection of the touch area TA is deactivated is shown in a dense dots pattern. The touch controller 14 activates detection of a new touch area TA in a portion of the upside section 311UP outside the second touch area TA2 that is the touch area TA due to the thumb FIN1, but deactivates detection of a new touch area TA at least in the second touch area TA2 of the upside section 311UP. More specifically, in the fourth embodiment, the touch controller 14 activates detection of a new touch area TA in a portion of the upside section 311UP of the display panel 311 on the opposite side to the first touch area side with respect to the second touch area TA2 in relation to the x-axis direction, that is, on the right side in FIG. 20, but deactivates detection of a new touch area TA in a portion other than the above portion of the upside section 311UP of the display panel 311. In this manner, since detection of the touch area TA is activated by the touch controller 14 in a portion of the upside section 311UP, the user can perform new touch operation with the opposite hand HAN to the hand HAN holding the display panel 311. On the other hand, since detection of a new touch area TA is deactivated by the touch controller 14 in the folded section 311FO and the underside section 311UN on which the user cannot easily view the image and on which touch operation is unlikely to be performed, it is suitable in terms of achieving low power consumption.

Besides, when the user changes the position of the folded section 311FO in the display panel 311, the area where a new touch area TA is detectable is changed by the touch controller 14 according to the position of the folded section 311FO changed. Specifically, when the user folds and holds the end side portion of the display panel 311, the touch controller 14 enables detection of a new touch area TA over a wider area than when the central portion of the display panel 311 is folded (see FIG. 20), as shown in FIG. 21. In this case, again, detection of a new touch area TA is deactivated in a portion other than the portion of the upside section 311UP of the display panel 311 on the opposite side to the first touch area with respect to the second touch area TA2 in relation to the x-axis direction. In this manner, when the user holds the display panel 311 in the folded state, the area where a new touch area TA is detectable is controlled by the touch controller 14 using the position of the thumb FIN1 as a reference.

As described above, according to the fourth embodiment, the touch controller 14 for controlling detection of the touch area TA performed by the touch detector 12 is provided, and the touch controller 14 activates detection of the touch area TA in at least a portion of the upside section 311UP of the display panel 311, but deactivates detection of the touch area TA in the folded section 311FO and the underside section 311UN disposed on the back side thereof of the display panel 311. In this manner, since the upside section 311UP of the display panel 311 faces the user, detection of the touch area TA in the upside section 311UP is activated by the touch controller 14, and thereby the touch area TA inputted by the user to be properly detected. On the other hand, since detection of the touch area TA is deactivated by the touch controller 14 in the folded section 311FO and the underside section 311UN of the display panel 311 which are unlikely to be viewed by the user and into which the touch area is unlikely to be inputted, it is suitable in terms of achieving low power consumption.

In addition, the touch controller 14 activates detection of the touch area TA outside the second touch area TA2 of the upside section 311UP, but deactivates detection of the touch area TA in the second touch area TA2. In this manner, since it is presumed that the hand HAN holding the display panel 311 is not touching the outside of the second touch area TA2 of the upside section 311UP of the display panel 311, detection of the touch area TA is activated by the touch controller 14, and thereby the input of the touch area TA from the hand HAN opposite to the hand HAN holding the display panel 311 can be properly detected. On the other hand, since the thumb FIN1 of the hand HAN holding the display panel 311 touches the second touch area TA of the upside section 311UP, even if the touch area TA due to the opposite hand HAN to the hand HAN holding the display panel 311 is inputted, that input is difficult to detect properly, and therefore, detection of the touch area TA is deactivated by the touch controller 14, and thereby further reduction in power consumption can be achieved.

Fifth Embodiment

A fifth embodiment of the present invention will be described with reference to FIG. 22 or FIG. 23. In the fifth embodiment, the display device 10 having the display controller modified from the fourth embodiment described above is illustrated. It should be noted that redundant descriptions of a structure, an action, and an effect similar to those of the fourth embodiment described above will be omitted.

Figure 22:
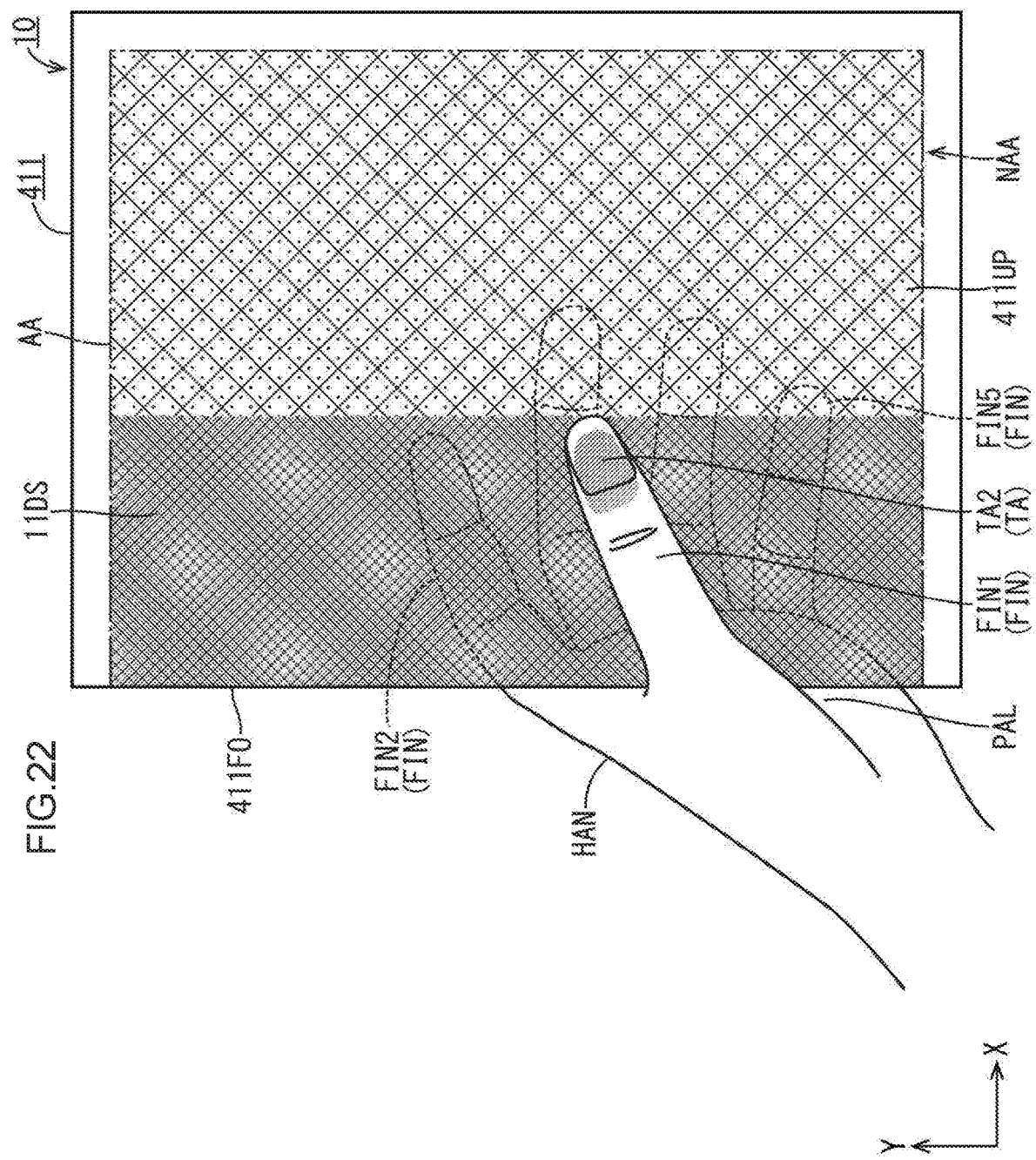
FIG. 22 is a plan view illustrating the user holding and folding the central portion of the display panel with the user's hand according to a fifth embodiment of the present invention.
Figure 23:
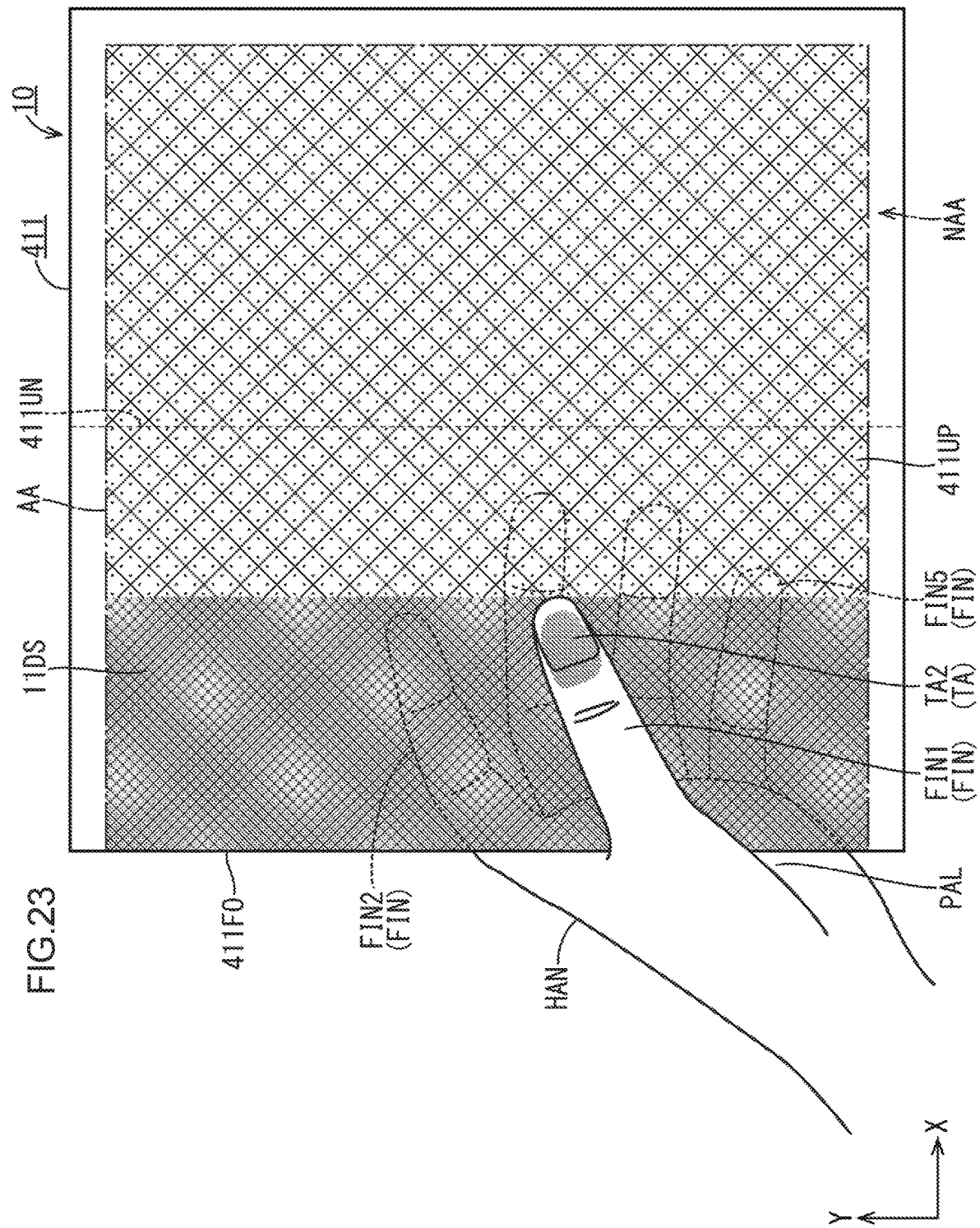
FIG. 23 is a plan view illustrating the user holding and folding the end side portion of the display panel with the user's hand.

The display controller 13 (see FIG. 2) according to the fifth embodiment displays an image on a upside section 411UP of the display panel 411, but does not display an image on a folded section 411FO and a underside section 411UN of the display panel 411, as shown in FIG. 22. It should be noted that, in FIGS. 22 and 23, an area where detection of the touch area TA is activated is shown in a sparse dots pattern and an area where detection of the touch area TA is deactivated is shown in a sparse dots pattern, and simultaneously an area where an image is displayed is shown in a hatching pattern with widely-spaced lines and an area where the image is not displayed is shown in a hatching pattern with narrowly-spaced lines. The display controller 13 displays different images on the second touch area TA2 and outside the second touch area TA2, respectively, in the upside section 411UP of the display panel 411, but makes an image undisplayed on the folded section 411FO and the underside section 411UN disposed on the back side thereof of a display panel 411. More specifically, in the fifth embodiment, the display controller 13 displays an image suitable for touch operation performed by the other hand HAN on a portion of the upside section 411UP of the display panel 411 on the opposite side to the first touch area side with respect to the second touch area TA2 in relation to the x-axis direction, that is, on the right side in FIG. 22, and displays an image unassociated with touch operation on a portion other than the above portion of the upside section 411UP of the display panel 411. The image unassociated with touch operation includes, for example, an indicator image such as remaining battery, clock, radio wave status, and the like. In this manner, a lot of information can be properly displayed on the upside section 411UP, and simultaneously it is suitable in terms of achieving low power consumption.

Besides, when the user changes the position of the folded section 411FO of the display panel 411, the image display area is changed by the display controller 13 according to the position of the folded section 411FO changed. Specifically, when the user folds and holds the end side portion of the display panel 411, the display controller 13 displays an image over a wider area than when the central portion of the display panel 411 is folded (see FIG. 22), as shown in FIG. 23. In this case, again, the image suitable for touch operation performed by the other hand HAN is displayed on a portion of the upside section 411UP of the display panel 411 on the opposite side to the first touch area TA1 with respect to the second touch area TA2 in relation to the x-axis direction, and the image unassociated with touch operation is displayed on a portion other than the above portion of the upside section 411UP of the display panel 411. In this manner, when the user holds the display panel 411 in the folded state, the areas where the images are each displayed are controlled by the display controller 13 using the position of the thumb FIN1 as a reference.

As described above, according to the fifth embodiment, the display controller 13 for controlling display of an image on the display panel 211 is provided, and the display controller 13 displays different images on the second touch area TA2 and outside the second touch area TA2, respectively, of the upside section 411UP of the display panel 411, but makes an image undisplayed on the folded section 411FO and the underside section 411UN disposed on the back side thereof of the display panel 411. Thus, since the upside section 411UP of the display panel 411 faces the user, an image is displayed on the upside section 411UP by the display controller 13, and thereby the user is enabled to view the image. At this time, since the display controller 13 displays different images on the second touch area TA2 touched by the thumb FIN1 of the user and on the outside the second touch area TA2 not touched by the thumb FIN1 of the user, respectively, of the upside section 411UP, for example, the image suitable for the input of the touch area TA from the hand HAN opposite to the hand HAN holding the display panel 411 can be displayed outside the second touch area TA2, and the image unassociated with the input of the touch area TA from the above opposite other hand HAN can be displayed on the second touch area TA2. On the other hand, since an image is made undisplayed by the display controller 13 on the folded section 411FO and the underside section 411UN of the display panel 411 that are unlikely to be viewed by the user, it is suitable in terms of achieving low power consumption.

Sixth Embodiment

A sixth embodiment of the present invention will be described with reference to FIG. 24 or FIG. 25. In the sixth embodiment, the display device 10 having a pressure detector 17 added to the configuration described in the above first embodiment is illustrated. It should be noted that redundant descriptions of a structure, an action, and an effect similar to those of the first embodiment described above will be omitted.

Figure 24:
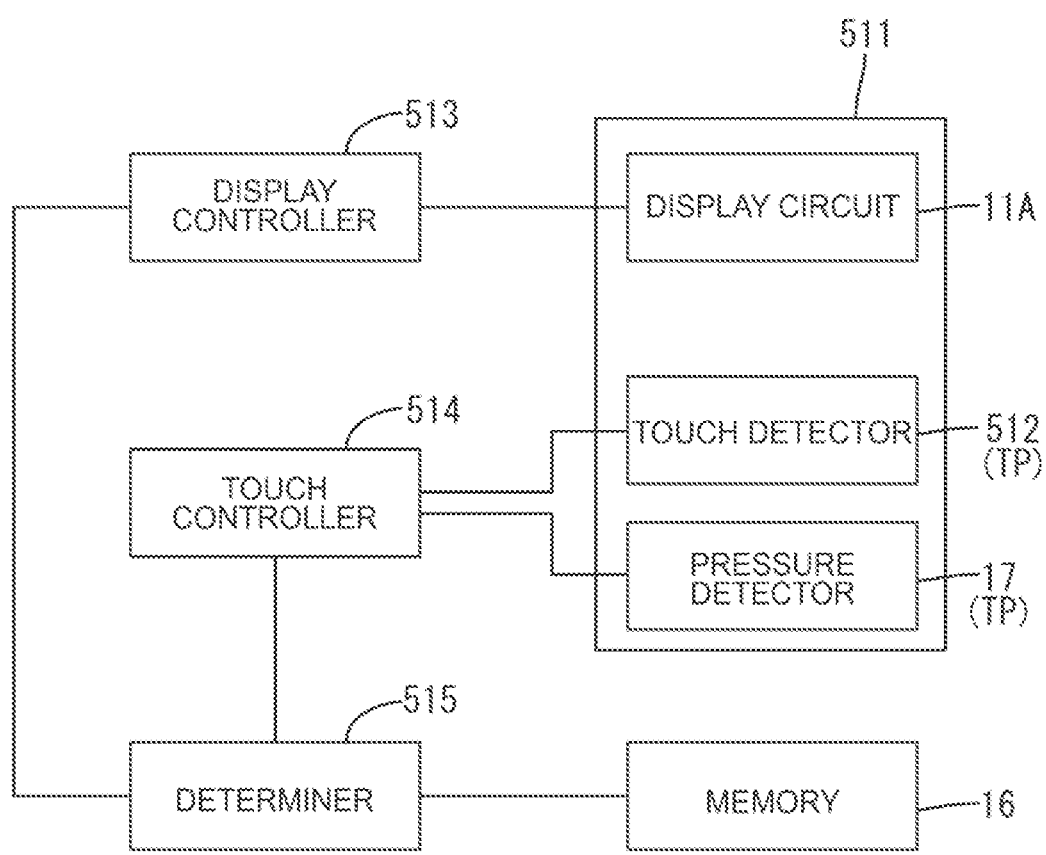
FIG. 24 is a block diagram illustrating an electrical configuration of a display device according to a sixth embodiment of the present invention.
Figure 25:
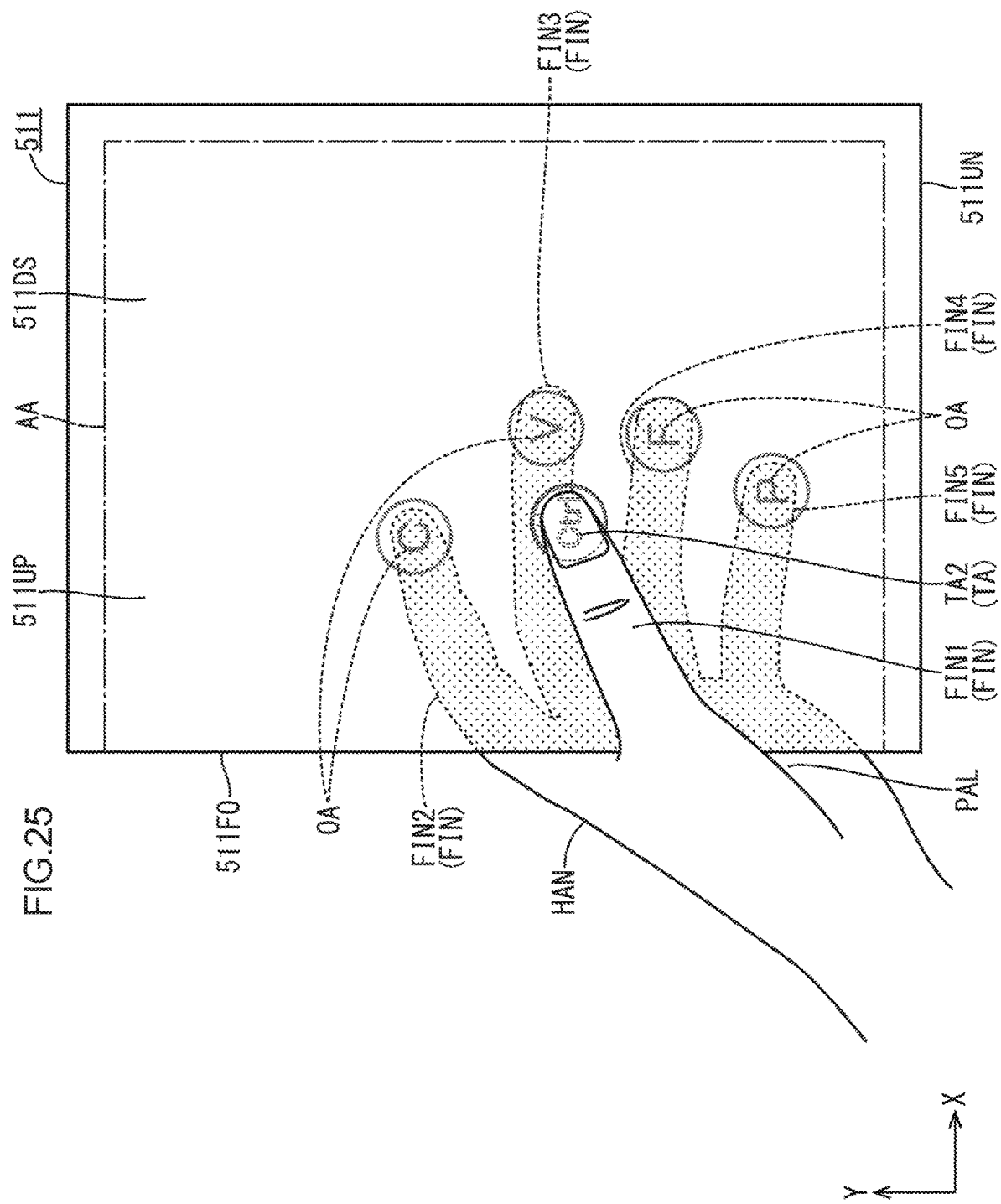
FIG. 25 is a plan view illustrating the user holding and folding the end side portion of the display panel with the user's hand.

The sixth embodiment is provided with the pressure detector 17 for detecting a pressure inputted by the hand HAN for inputting the touch area TA, as shown in FIG. 24. The pressure detector 17 according to the sixth embodiment is composed of a touchscreen pattern TP (see FIG. 1). That is, the same touchscreen pattern TP serves as both the pressure detector 17 and a touch detector 512. Therefore, it can be said that the pressure detector 17 is disposed on the same panel face as the touch detector 512 of a display panel 511. Specifically, once the change in capacitance is detected by the touch electrode TPE (see FIG. 1) constituting the touchscreen pattern TP, the touch controller 514 identifies the touch electrode TPE having the change in capacitance, and also extracts the touch area TA on the basis of the positional information thereon. In addition to that, the touch controller 514 can extract a pressure acting on a display screen 511DS from the hand HAN on the basis of the change in capacitance detected by the touch electrode TPE (see FIG. 1) constituting the touchscreen pattern TP. Therefore, in the sixth embodiment, it can be said that the touch controller 514 is a "pressure detection controller" for controlling the pressure detector 17.

Further, a determiner 515 determines that the touch area TA into which the pressure has been inputted has been depressed only if the pressure detected by the pressure detector 17 is equal to or higher than the threshold, as shown in FIG. 24. In detail, when the user holds the display panel 511 while folding it, a pressure due to the finger FIN touching the display screen 511DS is detected by the pressure detector 17. At this time, if the pressure detected does not exceed the threshold, the determination that the touch area TA into which the pressure has been inputted has not been depressed is made by the determiner 515. On the other hand, if the pressure detected is equal to or higher than the threshold, the determination that the touch area TA into which the pressure has been inputted has been depressed is made by the determiner 515. This improves the convenience when the user performs operation using the fingers FIN holding the display panel 511. Furthermore, when the determiner 515 determines that the display panel 511 is folded on the basis of the flowchart shown in FIG. 3 of the first embodiment described above, the determiner 515 determines that the second largest second touch area TA2 of the three or more touch areas TA detected by the touch detector 512 is present in the upside section 511UP of the display panel 511 (step S18). Thereupon, the display controller 513 displays a specific image selectively on an overlapping area OA overlapping in the upside section 511UP with the touch area TA inputted into the underside section 511UN of the display panel 511, as shown in FIG. 25. Specifically, the thumb FIN1 and the other four fingers FIN2 to FIN5 touch the upside section 511UP and the underside section 511UN, respectively, of the display panel 511, and specific images are displayed by the display controller 513 on four overlapping areas OA in the upside section 511UP overlapping with the respective touch areas TA due to the four fingers FIN2 to FIN5 of the fingers FIN. FIG. 25 illustrates a case where the letters "C", "V", "F", and "p" are displayed as images on the overlapping areas due to the index finger FIN2, the middle finger FIN3, the ring finger FIN4, and the little finger FIN5, respectively. A key associated with the letter displayed on the overlapping area OA is allocated to each of the fingers FIN2 to FIN5. This enables the user to know the positions of the fingers FIN2 to FIN5 touching the underside section 511UN. It should be noted that a Ctrl key is allocated to the thumb FIN1. Further, when the user inputs a pressure with each of the fingers FIN1 to FIN5 on the basis of the letter displayed in the overlapping area OA, the touch area TA into which the pressure has been inputted is detected by the determiner 515, so that processing for activating the key input allocated to the finger FIN1 to FIN5 with which the pressure has been inputted can be performed. It should be noted that a pressure input due to the opposite hand HAN to the hand HAN holding the display panel 511 can also be detected by the pressure detector 17, and in this case it is preferred that a key other than the above keys be allocated to the finger FN of the other hand HAN. In the above manner, improvement in operability is achieved.

As described above, according to the sixth embodiment, the pressure detector 17 disposed on the same panel face as the touch detector 512 of the display panel 511 for detecting a pressure inputted by the hand HAN that is the touch inputter for inputting the touch area TA is provided, and the determiner 515 determines that the touch area TA into which the pressure has been inputted has been depressed only if the pressure detected by the pressure detector 17 is equal to or higher than the threshold. This enables the pressure detector 17 disposed on the same panel face as the touch detector 512 of the display panel 511 to detect the pressure inputted into the touch area TA in the display panel 511 by the hand HAN that is the touch inputter. If the pressure detected by the pressure detector 17 does not exceed the threshold, the determination that the touch TA into which the pressure has been inputted has not been depressed is made by the determiner 515. On the other hand, if the pressure detected by the pressure detector 17 is equal to or higher than the threshold, the determination that the touch area TA into which the pressure has been inputted has been depressed is made by the determiner 515. This improves the convenience when the user performs operation with the fingers FIN holding the display panel 511. It should be noted that the hand HAN that is the touch inputter described above includes the finger FIN, the palm PAL, and the like, of the user.

In addition, the display controller 513 for controlling display of an image on the display panel 511 is provided, if the determiner 515 determines that the display panel 511 is folded, the determiner 515 determines that the second largest second touch area TA2 of the three or more touch areas TA detected by the touch detector 512 is present in the upside section 511UP disposed on the front side with respect to the folded section 511FO of the display panel 511, and the display controller 513 displays a specific image selectively on the overlapping area OA overlapping in the upside section 511UP with the touch area TA inputted into the underside section 511UN disposed on the back side with respect to the folded section 511FO of the display panel 511. When the user holds the display panel 511 and uses it in the folded state, usually the thumb FIN1 touches the upside section 511UP disposed on the front side with respect to the folded section 511FO of the display panel 511. The thumb FIN1 has a smaller touch area TA with respect to the display panel 511 than the palm PAL, but has a larger touch area TA with respect to the display panel 511 than any other fingers FIN. Hence, the second largest second touch area TA2 of the three or more touch areas TA detected by the touch detector 512 is due to the touch of the thumb FIN1, and therefore the determination that the second touch area TA2 is present in the upside section 511UP disposed on the front side with respect to the folded section 511FO of the display panel 511 is made by the determiner 515. On the other hand, the touch area TA present in the underside section 511UN disposed on the back side with respect to the folded section 511FO of the display panel 511 is due to the touch of the finger FIN other than the thumb FIN1, and it is difficult for the user to view this touch area TA directly since it is present in the underside section 511UN. For this reason, the display controller 513 for controlling image display on the display panel 511 displays a specific image selectively on the overlapping area OA in the upside section 511UP with the touch area TA inputted into the underside section 511UN of the display panel 511, so that the user can know the position of the finger FIN touching the underside section 511UN by viewing the image displayed on the overlapping area OA in the upside section 511UP.

Seventh Embodiment

Figure 26:
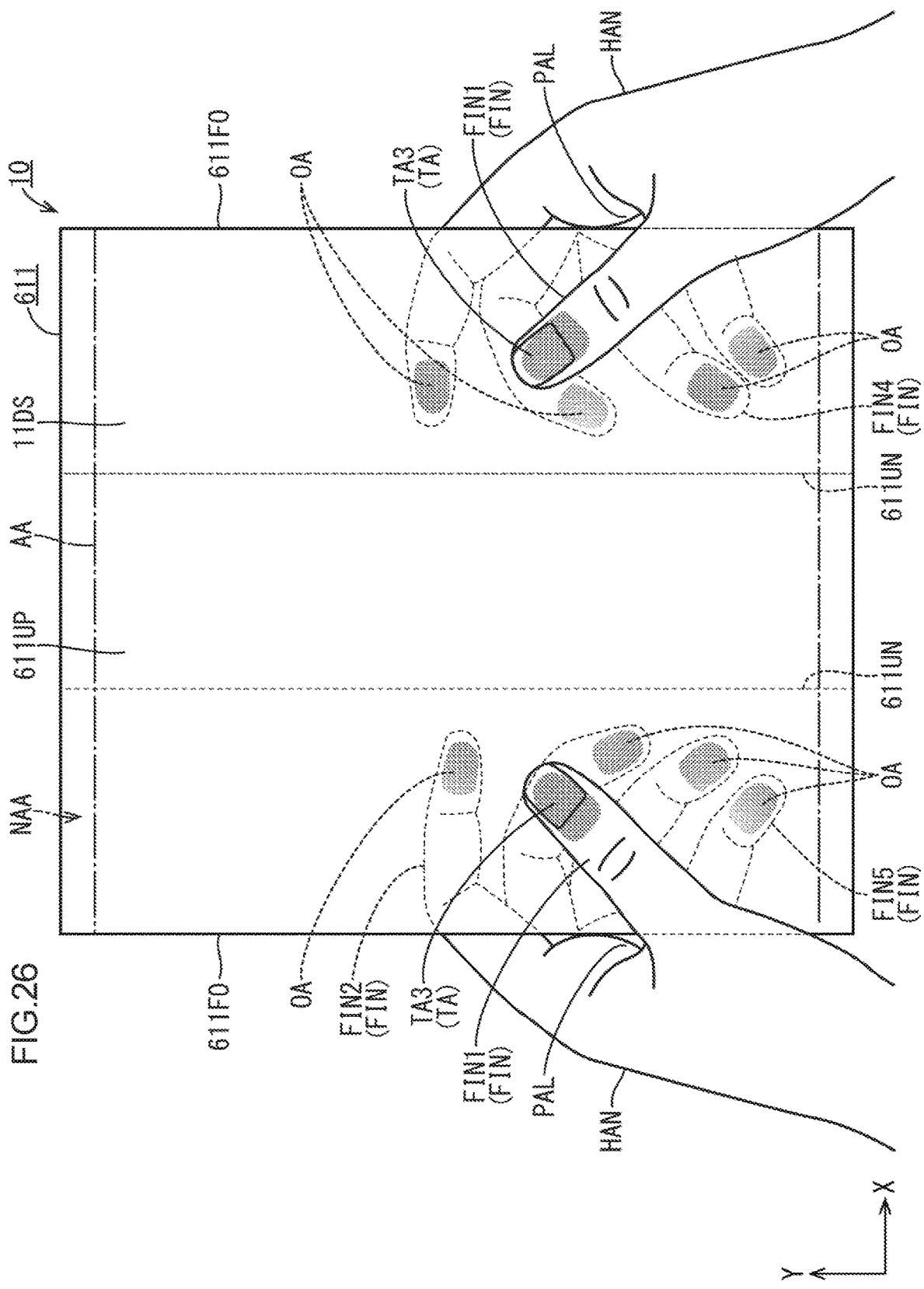
FIG. 26 is a plan view illustrating the user holding and folding both end side portions of the display panel with the user's hands, respectively, according to a seventh embodiment of the present invention.
Figure 27:
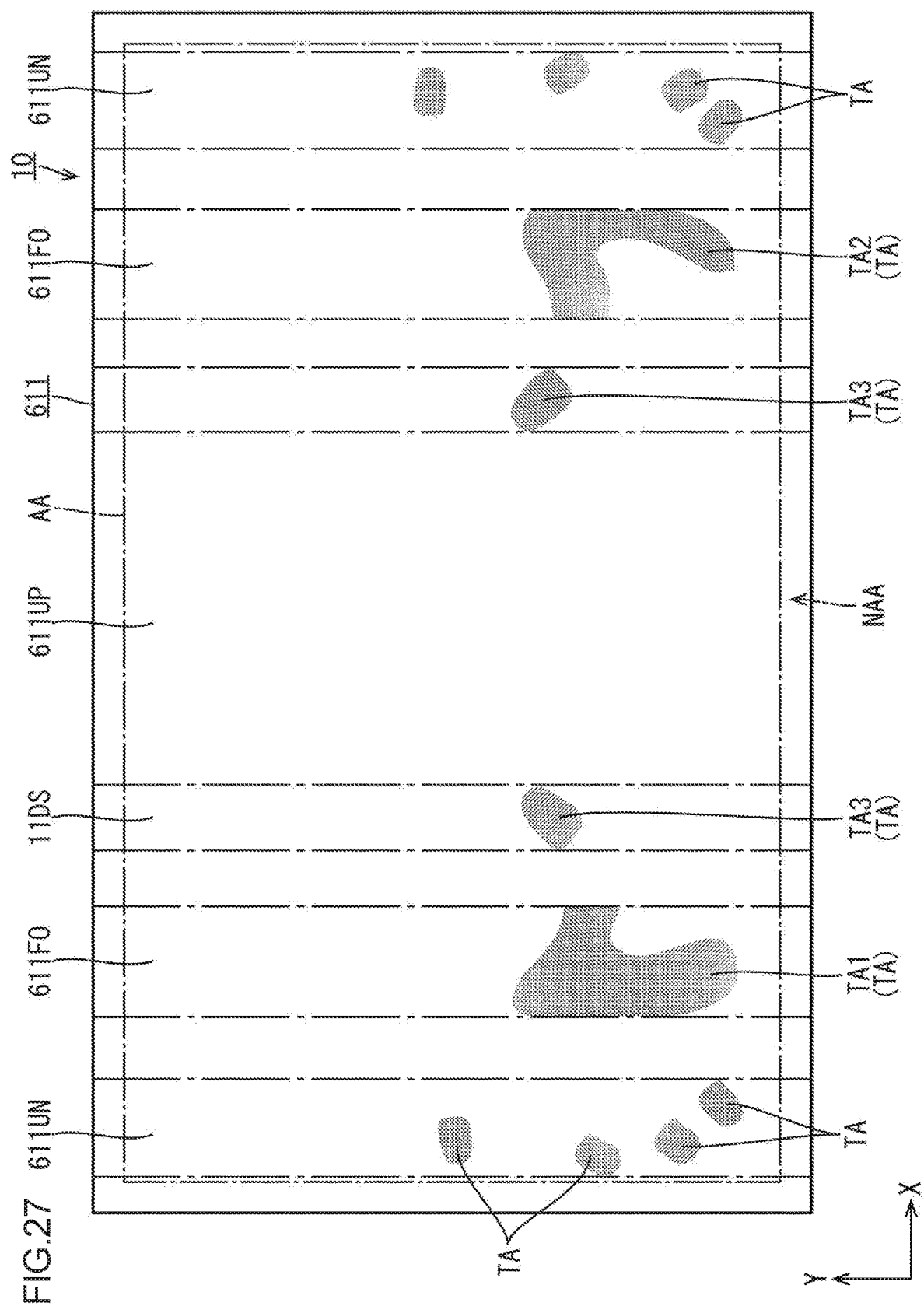
FIG. 27 is a plan view of the display panel illustrating a distribution of each touch area when the user holds and folds both the end side portions of the display panel with the user's hands, respectively.
Figure 28:
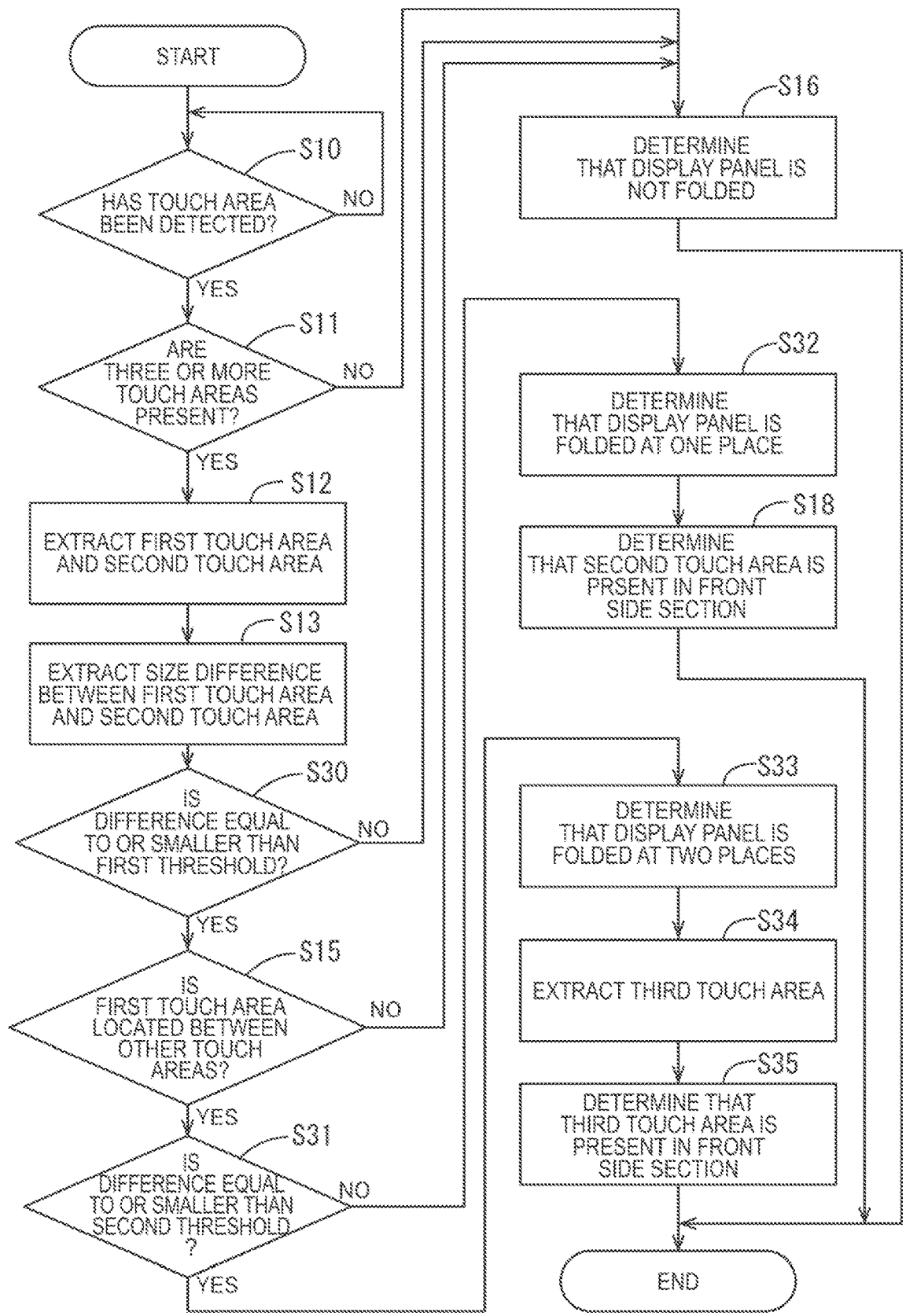
FIG. 28 is a flowchart illustrating a procedure for determining whether or not the display panel is folded.

A seventh embodiment of the present invention will be described with reference to FIGS. 26 to 28. In the seventh embodiment, the display device 10 modified to detect a case where two folded sections 611FO are present from the above sixth embodiment is illustrated. It should be noted redundant descriptions of a structure, an action, and an effect similar to those of the sixth embodiment described above will be omitted.

In the seventh embodiment, a case where the number of folded sections 611FO of a display panel 611 is one and a case where the number of folded sections 611FO thereof is two are distinguished by the determiner 515 (see FIG. 24). Now, the shape or the like of the display panel 611 having two folded sections 611FO will be described. For example, as shown in FIG. 26, the user may hold both end side portions in relation to the x-axis direction of the display panel 611 while folding them with one hand HAN and the other hand HAN, respectively. In this case, the respective thumb FIN1 of both the hands HAN touch an upside section 611UP of the display panel 611, whereas the respective four fingers FIN2 to FIN5 of both the hands HAN each touch an underside section 611UN. Therefore, eight overlapping areas OA in total occur in the upside section 611Up, and specific images are displayed on these overlapping areas OA in the same manner as the sixth embodiment described above. In the display panel 611 having two folded sections 611FO in this manner, as shown in FIG. 27, two touch areas TA due to the palms PAL are present, and ten touch areas TA due to the fingers FIN are present. From comparison between the sizes of these touch areas TA, the largest first touch area TA1 and the second largest second touch area TA2 are due to the palms PAL, respectively, and the third largest third touch area TA3 is a touch area TA due to either one of the thumbs FIN1. A size difference between the touch areas TA due to the respective palms PAL of both hands HAN is smaller than a size difference between the touch area TA due to the palm PAL and the touch area TA due to the thumb FIN1.

Next, a specific procedure for the determiner 515 determining whether or not the display panel 511 is folded, and further distinguishing the case where the number of folded sections 611FO is one and the case where the number of folded sections 611FO are two will be described with reference to the flowchart shown in FIG. 28. It should be noted that detailed descriptions of some parts of the flowchart shown in FIG. 28 (steps S10 to S13, step S15, step S16, step S18) will be omitted because they are the same as those of the flowchart described in the above first embodiment and shown in FIG. 3. The determiner 515 performs processing for determining whether or not the size difference between the first touch area TA1 and the second touch area TA2 is equal to or smaller than a first threshold stored in the memory 16 (see FIG. 24) (step S30), as shown in FIG. 28. This first threshold is the same as the threshold at step S14 of the flowchart described in the above first embodiment and shown in FIG. 3. Therefore, if the above difference exceeds the first threshold, the determination that the display panel 611 is not folded is made by the determiner 515 (step S16), whereas, if the above difference is equal to or lower than the first threshold, processing for determining whether or not the first touch area TA1 is located between the other touch areas TA is performed by the determiner 515 (step S15). If the first touch area TA1 is located between the other touch areas TA, the determiner 515 performs processing for determining whether or not the size difference between the first touch area TA1 and the second touch area TA2 is equal to or smaller than a second threshold stored in the memory 16 (step S31). This second threshold is set to be larger than the maximum value of a size difference between the touch area TA due to the palm PAL of one hand HAN and the touch area TA due to the palm PAL of the other hand HAN, and simultaneously to be smaller than the minimum value of a size difference between the touch area TA due to the palm PAL and the touch area TA due to the thumb FIN1. Therefore, if the size difference between the first touch area TA1 and the second touch area TA2 exceeds the second threshold, the determination that the display panel 611 is folded at one place is made by the determiner 515 (step S32). On the other hand, if the size difference between the first touch area TA1 and the second touch area TA2 is equal to or smaller than the second threshold, the determination that the display panel 611 is folded at two places is made by the determiner 515 (step S33). In this case, the determiner 515 extracts the third largest touch area TA as a third touch area TA3 (step S34), and determines that the third touch area TA3 is present in the upside section 611UP of the display panel 611 (step S35).

As described above, according to the seventh embodiment, the determiner 515 determines that the display panel 611 is folded at two places only if the size difference or ratio of the first touch area TA1 from/to the second largest second touch area TA2 of the three or more touch areas TA detected by the touch detector 512 is equal to or less than the threshold and the first touch area TA1 and the second touch area TA2 are each located between the other touch areas TA. When the user holds the display panel 611 with both hands HAN such that the display panel 611 is folded at two places, the touch areas TA due to the respective palms PAL of both hands HAN are the first touch area TA1 and the second touch area TA2. On the other hand, when the user holds the display panel 611 with one hand HAN such that the display panel 611 is folded at one place, the second largest touch area TA of the three or more touch areas TA is one due to the touch of the thumb FIN1. The size difference between the touch areas TA due to the respective palms PAL of both hands HAN is smaller than the size difference between the touch area TA due to the palm PAL and the touch area TA due to the thumb FIN1. Therefore, if the size difference or ratio of the first touch area TA1 from/to the second touch area TA2 exceeds the threshold, the user may be holding the display panel 611 with one hand HAN and folding it. In this case, the determiner 515 determines that the display panel 611 is folded at one place only if the first touch area TA1 is located between the other touch areas TA. On the other hand, if the size difference or ratio of the first touch area TA1 from/to the second touch area TA2 is equal to or less than the threshold, the user may be holding the display panel 611 with both hands HAN and folding two places thereof. In this case, the determiner 515 determines that the display panel 611 is folded at two places only if the first touch area TA1 and the second touch area TA2 are each located between the other touch areas TA.

Other Embodiments

The present invention is not limited to the embodiments described in the above description and with reference to drawings and, for example, the following embodiments are also included in the technical scope of the present invention.

(1) The flowchart described in the above first embodiment illustrates the case where the difference between the first touch area and the second touch area is extracted and whether or not the difference is equal to or smaller than the threshold is determined by the determiner, but alternatively the ratio of the first touch area to the second touch area may be extracted and whether or not the ratio is equal to or lower than the threshold may be determined by the determiner.

(2) The flowchart described in the seventh embodiment described above illustrates the case where the difference between the first touch area and the second touch area is extracted and whether or not the difference is equal to or smaller than the first threshold and whether or not the difference is equal to or less than the second threshold are determined by the determiner, but alternatively the ratio of the first touch area to the second touch area may be extracted and whether or not the ratio is equal to or lower than the first threshold and whether or not the ratio is equal to or lower than the second threshold may be determined by the determiner.

(3) The second embodiment described above illustrates the case where the genuine touch area and the hover touch area are determined by the determiner on the basis of the change in capacitance detected by the touchscreen pattern, but an optical sensor may be used in place of the touchscreen pattern. It is preferred that the optical sensor be incorporated in the display panel and also be capable of detecting, for example, infrared radiation, and the genuine touch area and the hover touch area can be determined by the determiner on the basis of the detection intensity of the infrared radiation reflected by the hand of the user.

(4) The sixth embodiment described above illustrates the case where the pressure detector detects a pressure on the basis of the change in capacitance, but alternatively the pressure may be detected on the basis of how the finger expands.

(5) The sixth embodiment described above illustrates the case where the touchscreen pattern serves as both the touch detector and the pressure detector, but the touchscreen pattern may constitute only the touch detector and the pressure detector may be provided separately from the touchscreen pattern. In that case, it is preferred that the pressure detector be composed of a pressure sensor that detects a pressure directly, or the like.

(6) Like the seventh embodiment described above, in the configuration enabling detection of the fact that two folded sections of the display panel are present, various functions can be allocated to the touch areas due to the respective fingers of both hands. For example, when the user sees a photograph as an image, it is preferred that a button for sending the photograph, a button for restoring the photograph, or the like, be allocated to a predetermined finger. In addition, when the user watches a video as images, it is preferred that a fast-forward button, a rewind button, a pause button, or the like, be allocated to a predetermined finger. In addition, when the user plays a game, it is preferred that an arrow key or the like be allocated to a predetermined finger.

(7) Each embodiment described above illustrates the case where only the thumb touches the front side section in the display panel folded, but it is also possible that, depending on how the user holds the display panel, the thumb and the index finger may touch the front side section. In that case, again, the other three fingers touch the back side section, and therefore whether or not the display panel is folded can be determined by the determiner.

The invention claimed is:

1. A display device comprising:
a foldable display panel having flexibility, the foldable display panel including
a touch detector including a capacitive touchscreen pattern disposed on one panel face of the foldable display panel to detect touch areas; and
a control board connected to the foldable display panel, the control board including a determiner configured to:
determine whether at least one of the touch areas is detected by the touch detector;
when the at least one of the touch areas is detected by the touch detector, determine whether the at least one of the touch areas includes three or more of the touch areas;
when the at least one of the touch areas detected by the touch detector includes the three or more of the touch areas, determine whether a largest touch area that is included in the three or more of the touch areas and largest among the three or more of the touch areas is located between other touch areas included in the three or more of the touch areas and other than the largest touch area; and
when the largest touch area is located between the other touch areas, determine the foldable display panel is folded.

2. The display device according to claim 1, wherein the determiner is further configured to:
define the largest touch area as a first touch area before determining whether the largest touch area is located between the other touch areas included in the three or more of the touch areas and other than the largest touch area;
define a second largest touch area among the three or more of the touch areas as a second touch area;
determine a size difference between the first touch area and the second touch area;
determine whether the size difference is equal to or less than a threshold; and
when the size difference is equal to or less than the threshold, determine whether the largest touch area is located between the other touch areas included in the three or more of the touch areas and other than the largest touch area.

3. The display device according to claim 1, wherein the determiner is further configured to:
define the largest touch area as a first touch area;
define a second largest touch area among the three or more of the touch areas as a second touch area;
determine a size difference between the first touch area and the second touch area;
determine whether the size difference is equal to or less than a threshold;
when the size difference is equal to or less than the threshold, determine whether the first touch area and the second touch area are located between the touch areas other than the first touch area and the second touch area, respectively; and
when the first touch area and the second touch area are located between the touch areas other than the first touch area and the second touch area, respectively, determine the fordable display panel is folded at two places.

4. The display device according to claim 1, wherein the determiner is further configured to determine that a second largest touch area among the three or more of the touch areas detected by the touch detector is present in a front side section disposed on a front side with respect to a folded section of the foldable display panel.

5. The display device according to claim 4, wherein the control board further includes:
a display controller configured to control the foldable display panel to display
an image on at least one portion of the front side section of the foldable display panel but not to display an image on the folded section and a back side section disposed on a back side thereof of the foldable display panel.

6. The display device according to claim 5, wherein the display controller is further configured to control the foldable display panel to display an image outside the second touch area of the front side section but not to display an image on the second touch area of the front side section.

7. The display device according to claim 4, wherein the control board further includes
a touch controller
configured to activate detection of the touch areas in at least one portion of the front side section of the foldable display panel but not to activate detection of the touch areas in the folded section and a back side section disposed on a back side thereof of the foldable display panel.

8. The display device according to claim 7, wherein the touch controller is further configured to activate detection of the touch areas outside the second touch area of the front side section but not to activate detection of the touch areas in the second touch area of the front side section.

9. The display device according to claim 8, wherein
the control board further includes a display controller
configured to control the foldable display panel to display different images on the second touch area and outside the second touch area, respectively, in the front side section of the foldable display panel but not to display an image on the folded section and a back side section disposed on a back side thereof of the foldable display panel.

10. The display device according to claim 1, wherein
the control board further includes a touch controller for configured to control the touch detector to detect the touch areas and to extract a detection intensity of each of the touch areas, and
the determiner is further configured to:
determine whether the detection intensity extracted by the touch controller is higher than a threshold;
when the detection intensity is higher than the threshold, define the touch areas as genuine touch areas where a touch inputter for inputting the touch areas touch the foldable display panel; and
when the detection intensity is lower than the threshold, define the touch areas as hover touch areas where the touch inputter are adjacent to the foldable display panel but do not touch the foldable display panel.

11. The display device according to claim 10, wherein the determiner is further configured to:
determine whether a portion of an outer peripheral edge of one of the genuine touch areas is contiguous to corresponding one of the hover touch areas; and
when the portion is contiguous to the corresponding one of the hover touch areas, determine that the touch inputter is a finger of a user and that a direction from the one of the genuine touch areas toward the one of the hover touch areas is a direction toward a base of the finger.

12. The display device according to claim 1, wherein
the foldable display panel further includes a pressure detector disposed on a panel face on which the touch detector is disposed,
the pressure detector is configured to detect a pressure inputted by a touch inputter for inputting one of the touch areas, and
the determiner is further configured to:
   determine whether the pressure detected by the pressure detector is equal to or higher than a threshold; and
   when the pressure is equal to or higher than the threshold, determine that the touch area into which the pressure has been inputted has been depressed.

13. The display device according to claim 12, wherein
the control board further includes
a display controller configured to control the foldable display panel to display an image on the foldable display panel,
the determiner is further configured to, when the foldable display panel is folded, determine that a second largest touch area among the three or more of the touch areas detected by the touch detector is present in a front side section disposed on a front side with respect to a folded section of the foldable display panel, and
the display controller is configured to control the foldable display panel to display a specific image on an overlapping area overlapping in the front side section with the touch area inputted into a back side section disposed on a back side with respect to the folded section of the foldable display panel.

* * * * *